US 10,139,916 B2

(12) United States Patent
Poupyrev

(10) Patent No.: US 10,139,916 B2
(45) Date of Patent: Nov. 27, 2018

(54) WIDE-FIELD RADAR-BASED GESTURE RECOGNITION

(71) Applicant: Google Inc., Mountain View, CA (US)

(72) Inventor: Ivan Poupyrev, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/142,619

(22) Filed: Apr. 29, 2016

(65) Prior Publication Data

US 2016/0320852 A1    Nov. 3, 2016

Related U.S. Application Data

(60) Provisional application No. 62/155,357, filed on Apr. 30, 2015.

(51) Int. Cl.
| | |
|---|---|
| *G06F 3/01* | (2006.01) |
| *G01S 7/41* | (2006.01) |
| *G01S 13/88* | (2006.01) |
| *G06F 3/03* | (2006.01) |
| *G06K 9/00* | (2006.01) |

(52) U.S. Cl.
CPC .............. *G06F 3/017* (2013.01); *G01S 7/415* (2013.01); *G01S 13/88* (2013.01); *G06F 3/011* (2013.01); *G06F 3/0325* (2013.01); *G06K 9/00355* (2013.01)

(58) Field of Classification Search
CPC ........ G06F 3/017; G06F 3/011; G06F 3/0325; G01S 7/415; G01S 13/88; G06K 9/00355
USPC ........................................................ 345/156
See application file for complete search history.

(56) References Cited

U.S. PATENT DOCUMENTS

| | | |
|---|---|---|
| 3,610,874 A | 10/1971 | Gagliano |
| 3,752,017 A | 8/1973 | Lloyd et al. |
| 3,953,706 A | 4/1976 | Harris et al. |
| 4,104,012 A | 8/1978 | Ferrante |
| 4,654,967 A | 4/1987 | Thenner |
| 4,700,044 A | 10/1987 | Hokanson et al. |
| 4,795,998 A | 1/1989 | Dunbar et al. |
| 4,838,797 A | 6/1989 | Dodier |
| 5,016,500 A | 5/1991 | Conrad et al. |
| 5,298,715 A | 3/1994 | Chalco et al. |
| 5,341,979 A | 8/1994 | Gupta |
| 5,468,917 A | 11/1995 | Brodsky et al. |

(Continued)

FOREIGN PATENT DOCUMENTS

| | | |
|---|---|---|
| CN | 202887794 | 4/2013 |
| CN | 103355860 | 1/2016 |

(Continued)

OTHER PUBLICATIONS

"Corrected Notice of Allowance", U.S. Appl. No. 14/312,486, dated Oct. 28, 2016, 4 pages.

(Continued)

*Primary Examiner* — Nicholas Lee
*Assistant Examiner* — Ngan T Pham Lu
(74) *Attorney, Agent, or Firm* — Colby Nipper

(57) ABSTRACT

This document describes techniques using, and devices embodying, wide-field radar-based gesture recognition. These techniques and devices can enable a great breadth of gestures and uses for those gestures, such as gestures to use, control, and interact with computing and non-computing devices, from software applications to refrigerators.

20 Claims, 8 Drawing Sheets

(56) References Cited

U.S. PATENT DOCUMENTS

| | | |
|---|---|---|
| 5,564,571 A | 10/1996 | Zanotti |
| 5,656,798 A | 8/1997 | Kubo et al. |
| 5,724,707 A | 3/1998 | Kirk et al. |
| 5,798,798 A | 8/1998 | Rector et al. |
| 6,032,450 A | 3/2000 | Blum |
| 6,080,690 A | 6/2000 | Lebby et al. |
| 6,101,431 A | 8/2000 | Niwa et al. |
| 6,210,771 B1 | 4/2001 | Post et al. |
| 6,313,825 B1 | 11/2001 | Gilbert |
| 6,340,979 B1 | 1/2002 | Beaton et al. |
| 6,386,757 B1 | 5/2002 | Konno |
| 6,440,593 B2 | 8/2002 | Ellison et al. |
| 6,492,980 B2 | 12/2002 | Sandbach |
| 6,493,933 B1 | 12/2002 | Post et al. |
| 6,513,970 B1 | 2/2003 | Tabata et al. |
| 6,543,668 B1 | 4/2003 | Fujii et al. |
| 6,711,354 B2 | 3/2004 | Kameyama |
| 6,717,065 B2 | 4/2004 | Hosaka et al. |
| 6,802,720 B2 | 10/2004 | Weiss et al. |
| 6,833,807 B2 | 12/2004 | Flacke et al. |
| 6,835,898 B2 | 12/2004 | Eldridge et al. |
| 6,854,985 B1 | 2/2005 | Weiss |
| 6,929,484 B2 | 8/2005 | Weiss et al. |
| 7,134,879 B2 | 11/2006 | Sugimoto et al. |
| 7,164,820 B2 | 1/2007 | Eves et al. |
| 7,223,105 B2 | 5/2007 | Weiss et al. |
| 7,230,610 B2 | 6/2007 | Jung et al. |
| 7,249,954 B2 | 7/2007 | Weiss |
| 7,299,964 B2 | 11/2007 | Jayaraman et al. |
| 7,310,236 B2 | 12/2007 | Takahashi et al. |
| 7,317,416 B2 | 1/2008 | Flom et al. |
| 7,348,285 B2 | 3/2008 | Dhawan et al. |
| 7,365,031 B2 | 4/2008 | Swallow et al. |
| 7,421,061 B2 | 9/2008 | Boese et al. |
| 7,462,035 B2 | 12/2008 | Lee et al. |
| 7,528,082 B2 | 5/2009 | Krans et al. |
| 7,544,627 B2 | 6/2009 | Tao et al. |
| 7,578,195 B2 | 8/2009 | DeAngelis et al. |
| 7,644,488 B2 | 1/2010 | Aisenbrey |
| 7,670,144 B2 | 3/2010 | Ito et al. |
| 7,677,729 B2 | 3/2010 | Vilser et al. |
| 7,691,067 B2 | 4/2010 | Westbrook et al. |
| 7,698,154 B2 | 4/2010 | Marchosky |
| 7,791,700 B2 | 9/2010 | Bellamy |
| 7,834,276 B2 | 11/2010 | Chou et al. |
| 7,941,676 B2 | 5/2011 | Glaser |
| 7,952,512 B1 | 5/2011 | Delker et al. |
| 8,062,220 B2 | 11/2011 | Kurtz et al. |
| 8,169,404 B1 | 5/2012 | Boillot |
| 8,179,604 B1 | 5/2012 | Prada Gomez et al. |
| 8,282,232 B2 | 10/2012 | Hsu et al. |
| 8,289,185 B2 | 10/2012 | Alonso |
| 8,301,232 B2 | 10/2012 | Albert et al. |
| 8,334,226 B2 | 12/2012 | Nhan et al. |
| 8,341,762 B2 | 1/2013 | Balzano |
| 8,367,942 B2 | 2/2013 | Howell et al. |
| 8,475,367 B1 | 7/2013 | Yuen et al. |
| 8,505,474 B2 | 8/2013 | Kang et al. |
| 8,514,221 B2 | 8/2013 | King et al. |
| 8,549,829 B2 | 10/2013 | Song et al. |
| 8,560,972 B2 | 10/2013 | Wilson |
| 8,569,189 B2 | 10/2013 | Bhattacharya et al. |
| 8,614,689 B2 | 12/2013 | Nishikawa et al. |
| 8,700,137 B2 | 4/2014 | Albert |
| 8,758,020 B2 | 6/2014 | Burdea et al. |
| 8,759,713 B2 | 6/2014 | Sheats |
| 8,764,651 B2 | 7/2014 | Tran |
| 8,785,778 B2 | 7/2014 | Streeter et al. |
| 8,790,257 B2 | 7/2014 | Libbus et al. |
| 8,814,574 B2 | 8/2014 | Selby et al. |
| 8,921,473 B1 | 12/2014 | Hyman |
| 8,948,839 B1 | 2/2015 | Longinotti-Buitoni et al. |
| 9,055,879 B2 | 6/2015 | Selby et al. |
| 9,093,289 B2 | 7/2015 | Vicard et al. |
| 9,125,456 B2 | 9/2015 | Chow |
| 9,141,194 B1 | 9/2015 | Keyes et al. |
| 9,148,949 B2 | 9/2015 | Guofu et al. |
| 9,230,160 B1 | 1/2016 | Kanter |
| 9,331,422 B2 | 5/2016 | Nazzaro et al. |
| 9,335,825 B2 | 5/2016 | Rautianinen et al. |
| 9,569,001 B2 | 2/2017 | Mistry et al. |
| 9,575,560 B2 | 2/2017 | Poupyrev et al. |
| 9,588,625 B2 | 3/2017 | Poupyrev |
| 9,594,443 B2 | 3/2017 | VanBlon et al. |
| 9,600,080 B2 | 3/2017 | Poupyrev |
| 9,693,592 B2 | 7/2017 | Robinson et al. |
| 9,766,742 B2 | 9/2017 | Papakostas |
| 9,778,749 B2 | 10/2017 | Poupyrev |
| 9,811,164 B2 | 11/2017 | Poupyrev |
| 9,817,109 B2 | 11/2017 | Saboo et al. |
| 9,837,760 B2 | 12/2017 | Karagozler et al. |
| 9,921,660 B2 | 3/2018 | Poupyrev |
| 9,933,908 B2 | 4/2018 | Poupyrev |
| 9,971,414 B2 | 5/2018 | Gollakota et al. |
| 9,971,415 B2 | 5/2018 | Poupyrev et al. |
| 9,983,747 B2 | 5/2018 | Poupyrev |
| 10,082,950 B2 | 9/2018 | Lapp |
| 10,088,908 B1 | 10/2018 | Poupyrev et al. |
| 2001/0035836 A1 | 11/2001 | Miceli et al. |
| 2002/0080156 A1 | 6/2002 | Abbott et al. |
| 2002/0170897 A1 | 11/2002 | Hall |
| 2003/0100228 A1 | 5/2003 | Bungo et al. |
| 2003/0119391 A1 | 6/2003 | Swallow et al. |
| 2004/0009729 A1 | 1/2004 | Hill et al. |
| 2004/0259391 A1 | 12/2004 | Jung et al. |
| 2005/0069695 A1 | 3/2005 | Jung et al. |
| 2005/0128124 A1 | 6/2005 | Greneker et al. |
| 2005/0148876 A1 | 7/2005 | Endoh et al. |
| 2006/0035554 A1 | 2/2006 | Glaser et al. |
| 2006/0040739 A1 | 2/2006 | Wells |
| 2006/0061504 A1 | 3/2006 | Leach, Jr. et al. |
| 2006/0125803 A1 | 6/2006 | Westerman et al. |
| 2006/0148351 A1 | 7/2006 | Tao et al. |
| 2006/0157734 A1 | 7/2006 | Onodero et al. |
| 2006/0166620 A1 | 7/2006 | Sorensen |
| 2006/0170584 A1 | 8/2006 | Romero et al. |
| 2006/0209021 A1 | 9/2006 | Yoo et al. |
| 2006/0258205 A1 | 11/2006 | Locher et al. |
| 2007/0024488 A1 | 2/2007 | Zemany et al. |
| 2007/0026695 A1 | 2/2007 | Lee et al. |
| 2007/0118043 A1 | 5/2007 | Oliver et al. |
| 2007/0161921 A1 | 7/2007 | Rausch |
| 2007/0176821 A1 | 8/2007 | Flom et al. |
| 2007/0192647 A1 | 8/2007 | Glaser |
| 2007/0197116 A1 | 8/2007 | Eves et al. |
| 2007/0197878 A1 | 8/2007 | Shklarski |
| 2007/0210074 A1 | 9/2007 | Maurer et al. |
| 2007/0237423 A1 | 10/2007 | Tico et al. |
| 2008/0002027 A1 | 1/2008 | Kondo et al. |
| 2008/0024438 A1 | 1/2008 | Collins et al. |
| 2008/0065291 A1 | 3/2008 | Breed |
| 2008/0134102 A1 | 6/2008 | Movold et al. |
| 2008/0136775 A1 | 6/2008 | Conant |
| 2008/0168396 A1 | 7/2008 | Matas et al. |
| 2008/0211766 A1 | 9/2008 | Westerman et al. |
| 2008/0233822 A1 | 9/2008 | Swallow et al. |
| 2008/0282665 A1 | 11/2008 | Speleers |
| 2008/0291158 A1 | 11/2008 | Park et al. |
| 2008/0303800 A1 | 12/2008 | Elwell |
| 2008/0316085 A1 | 12/2008 | Rofougaran et al. |
| 2008/0320419 A1 | 12/2008 | Matas et al. |
| 2009/0018428 A1 | 1/2009 | Dias et al. |
| 2009/0033585 A1 | 2/2009 | Lang |
| 2009/0053950 A1 | 2/2009 | Surve |
| 2009/0056300 A1 | 3/2009 | Chung et al. |
| 2009/0058820 A1 | 3/2009 | Hinckley |
| 2009/0113298 A1 | 4/2009 | Jung et al. |
| 2009/0115617 A1 | 5/2009 | Sano et al. |
| 2009/0118648 A1 | 5/2009 | Kandori et al. |
| 2009/0149036 A1 | 6/2009 | Lee et al. |
| 2009/0177068 A1 | 7/2009 | Stivoric et al. |
| 2009/0203244 A1 | 8/2009 | Toonder |
| 2009/0270690 A1 | 10/2009 | Roos et al. |
| 2009/0278915 A1 | 11/2009 | Kramer et al. |

(56) References Cited

U.S. PATENT DOCUMENTS

| | | |
|---|---|---|
| 2009/0288762 A1 | 11/2009 | Wolfel |
| 2009/0295712 A1 | 12/2009 | Ritzau |
| 2009/0319181 A1 | 12/2009 | Khosravy et al. |
| 2010/0050133 A1 | 2/2010 | Nishihara et al. |
| 2010/0053151 A1 | 3/2010 | Marti et al. |
| 2010/0065320 A1 | 3/2010 | Urano |
| 2010/0071205 A1 | 3/2010 | Graumann et al. |
| 2010/0094141 A1 | 4/2010 | Puswella |
| 2010/0201586 A1 | 8/2010 | Michalk |
| 2010/0205667 A1 | 8/2010 | Anderson et al. |
| 2010/0208035 A1 | 8/2010 | Pinault et al. |
| 2010/0225562 A1 | 9/2010 | Smith |
| 2010/0234094 A1 | 9/2010 | Gagner et al. |
| 2010/0241009 A1 | 9/2010 | Petkie |
| 2010/0281438 A1 | 11/2010 | Latta et al. |
| 2010/0306713 A1 | 12/2010 | Geisner et al. |
| 2010/0313414 A1 | 12/2010 | Sheats |
| 2010/0325770 A1 | 12/2010 | Chung et al. |
| 2011/0003664 A1 | 1/2011 | Richard |
| 2011/0010014 A1 | 1/2011 | Oexman et al. |
| 2011/0073353 A1 | 3/2011 | Lee et al. |
| 2011/0093820 A1 | 4/2011 | Zhang et al. |
| 2011/0166940 A1 | 7/2011 | Bangera et al. |
| 2011/0181509 A1 | 7/2011 | Rautiainen et al. |
| 2011/0181510 A1* | 7/2011 | Hakala .................... G06F 3/017 345/158 |
| 2011/0197263 A1 | 8/2011 | Stinson, III |
| 2011/0213218 A1 | 9/2011 | Weiner et al. |
| 2011/0221666 A1 | 9/2011 | Newton et al. |
| 2011/0234492 A1 | 9/2011 | Ajmera et al. |
| 2011/0239118 A1 | 9/2011 | Yamaoka et al. |
| 2011/0279303 A1 | 11/2011 | Smith |
| 2011/0303341 A1 | 12/2011 | Meiss et al. |
| 2011/0307842 A1 | 12/2011 | Chiang et al. |
| 2011/0318985 A1 | 12/2011 | McDermid |
| 2012/0001875 A1 | 1/2012 | Li et al. |
| 2012/0019168 A1 | 1/2012 | Noda et al. |
| 2012/0047468 A1 | 2/2012 | Santos et al. |
| 2012/0068876 A1 | 3/2012 | Bangera et al. |
| 2012/0092284 A1 | 4/2012 | Rofougaran et al. |
| 2012/0123232 A1 | 5/2012 | Najarian et al. |
| 2012/0127082 A1 | 5/2012 | Kushler et al. |
| 2012/0144934 A1 | 6/2012 | Russell et al. |
| 2012/0150493 A1 | 6/2012 | Casey et al. |
| 2012/0154313 A1 | 6/2012 | Au et al. |
| 2012/0156926 A1 | 6/2012 | Kato et al. |
| 2012/0174299 A1 | 7/2012 | Balzano |
| 2012/0174736 A1 | 7/2012 | Wang et al. |
| 2012/0193801 A1 | 8/2012 | Gross et al. |
| 2012/0248093 A1 | 10/2012 | Ulrich et al. |
| 2012/0254810 A1 | 10/2012 | Heck et al. |
| 2012/0268416 A1 | 10/2012 | Pirogov et al. |
| 2012/0280900 A1 | 11/2012 | Wang et al. |
| 2012/0298748 A1 | 11/2012 | Factor et al. |
| 2012/0310665 A1 | 12/2012 | Xu et al. |
| 2013/0016070 A1 | 1/2013 | Starner et al. |
| 2013/0027218 A1 | 1/2013 | Schwarz et al. |
| 2013/0046544 A1 | 2/2013 | Kay et al. |
| 2013/0053653 A1 | 2/2013 | Cuddihy et al. |
| 2013/0078624 A1 | 3/2013 | Holmes et al. |
| 2013/0082922 A1 | 4/2013 | Miller |
| 2013/0083173 A1 | 4/2013 | Geisner et al. |
| 2013/0102217 A1 | 4/2013 | Jeon |
| 2013/0104084 A1 | 4/2013 | Mlyniec et al. |
| 2013/0117377 A1 | 5/2013 | Miller |
| 2013/0132931 A1 | 5/2013 | Bruns et al. |
| 2013/0147833 A1 | 6/2013 | Aubauer et al. |
| 2013/0150735 A1 | 6/2013 | Cheng |
| 2013/0161078 A1 | 6/2013 | Li |
| 2013/0169471 A1 | 7/2013 | Lynch |
| 2013/0194173 A1 | 8/2013 | Zhu et al. |
| 2013/0195330 A1 | 8/2013 | Kim et al. |
| 2013/0196716 A1 | 8/2013 | Khurram |
| 2013/0207962 A1 | 8/2013 | Oberdorfer et al. |
| 2013/0253029 A1 | 9/2013 | Jain et al. |
| 2013/0260630 A1 | 10/2013 | Ito et al. |
| 2013/0278499 A1 | 10/2013 | Anderson |
| 2013/0278501 A1 | 10/2013 | Bulzacki |
| 2013/0283203 A1 | 10/2013 | Batraski et al. |
| 2013/0332438 A1 | 12/2013 | Li et al. |
| 2013/0345569 A1 | 12/2013 | Mestha et al. |
| 2014/0005809 A1 | 1/2014 | Frei et al. |
| 2014/0049487 A1 | 2/2014 | Konertz et al. |
| 2014/0050354 A1 | 2/2014 | Heim et al. |
| 2014/0070957 A1 | 3/2014 | Longinotti-Buitoni et al. |
| 2014/0073969 A1 | 3/2014 | Zou et al. |
| 2014/0081100 A1 | 3/2014 | Muhsin et al. |
| 2014/0095480 A1 | 4/2014 | Marantz et al. |
| 2014/0121540 A1 | 5/2014 | Raskin |
| 2014/0135631 A1 | 5/2014 | Brumback et al. |
| 2014/0139422 A1 | 5/2014 | Mistry et al. |
| 2014/0139616 A1 | 5/2014 | Pinter et al. |
| 2014/0143678 A1 | 5/2014 | Mistry et al. |
| 2014/0184496 A1 | 7/2014 | Gribetz et al. |
| 2014/0191939 A1 | 7/2014 | Penn et al. |
| 2014/0200416 A1 | 7/2014 | Kashef et al. |
| 2014/0201690 A1 | 7/2014 | Holz |
| 2014/0208275 A1 | 7/2014 | Mongia et al. |
| 2014/0215389 A1 | 7/2014 | Walsh et al. |
| 2014/0239065 A1 | 8/2014 | Zhou et al. |
| 2014/0244277 A1 | 8/2014 | Krishna Rao et al. |
| 2014/0246415 A1 | 9/2014 | Wittkowski |
| 2014/0247212 A1 | 9/2014 | Kim et al. |
| 2014/0250515 A1 | 9/2014 | Jakobsson |
| 2014/0253431 A1* | 9/2014 | Gossweiler, III ........ G06F 3/017 345/156 |
| 2014/0253709 A1 | 9/2014 | Bresch et al. |
| 2014/0262478 A1 | 9/2014 | Harris et al. |
| 2014/0280295 A1 | 9/2014 | Kurochikin et al. |
| 2014/0281975 A1 | 9/2014 | Anderson et al. |
| 2014/0297006 A1 | 10/2014 | Sadhu |
| 2014/0298266 A1 | 10/2014 | Lapp |
| 2014/0306936 A1 | 10/2014 | Dahl et al. |
| 2014/0316261 A1 | 10/2014 | Lux et al. |
| 2014/0318699 A1 | 10/2014 | Longinotti-Buitoni et al. |
| 2014/0324888 A1* | 10/2014 | Xie .......................... G06F 3/017 707/748 |
| 2014/0333467 A1 | 11/2014 | Inomata |
| 2014/0343392 A1 | 11/2014 | Yang |
| 2014/0347295 A1 | 11/2014 | Kim et al. |
| 2014/0357369 A1 | 12/2014 | Callens et al. |
| 2015/0002391 A1 | 1/2015 | Chen |
| 2015/0009096 A1 | 1/2015 | Lee et al. |
| 2015/0029050 A1 | 1/2015 | Driscoll et al. |
| 2015/0030256 A1 | 1/2015 | Brady et al. |
| 2015/0040040 A1 | 2/2015 | Balan et al. |
| 2015/0062033 A1 | 3/2015 | Ishihara |
| 2015/0068069 A1 | 3/2015 | Tran et al. |
| 2015/0077282 A1 | 3/2015 | Mohamadi |
| 2015/0085060 A1 | 3/2015 | Fish et al. |
| 2015/0091820 A1 | 4/2015 | Rosenberg et al. |
| 2015/0091858 A1 | 4/2015 | Rosenberg et al. |
| 2015/0091859 A1 | 4/2015 | Rosenberg et al. |
| 2015/0112606 A1 | 4/2015 | He et al. |
| 2015/0133017 A1 | 5/2015 | Liao et al. |
| 2015/0143601 A1 | 5/2015 | Longinotti-Buitoni et al. |
| 2015/0145805 A1 | 5/2015 | Liu |
| 2015/0162729 A1 | 6/2015 | Reversat et al. |
| 2015/0177866 A1 | 6/2015 | Hwang et al. |
| 2015/0185314 A1 | 7/2015 | Corcos et al. |
| 2015/0199045 A1 | 7/2015 | Robucci et al. |
| 2015/0226004 A1 | 8/2015 | Thompson |
| 2015/0256763 A1 | 9/2015 | Niemi |
| 2015/0261320 A1 | 9/2015 | Leto |
| 2015/0268027 A1 | 9/2015 | Gerdes |
| 2015/0268799 A1 | 9/2015 | Starner et al. |
| 2015/0277569 A1* | 10/2015 | Sprenger ................. G06F 3/017 345/156 |
| 2015/0280102 A1 | 10/2015 | Tajitsu et al. |
| 2015/0312041 A1 | 10/2015 | Choi |
| 2015/0317518 A1 | 11/2015 | Fujimaki et al. |
| 2015/0323993 A1 | 11/2015 | Levesque et al. |
| 2015/0332075 A1 | 11/2015 | Burch |
| 2015/0341550 A1 | 11/2015 | Lay |

(56) References Cited

U.S. PATENT DOCUMENTS

| | | |
|---|---|---|
| 2015/0346820 A1 | 12/2015 | Poupyrev et al. |
| 2015/0375339 A1 | 12/2015 | Sterling et al. |
| 2016/0018948 A1 | 1/2016 | Parvarandeh et al. |
| 2016/0026253 A1 | 1/2016 | Bradski et al. |
| 2016/0038083 A1 | 2/2016 | Ding et al. |
| 2016/0041617 A1 | 2/2016 | Poupyrev |
| 2016/0041618 A1 | 2/2016 | Poupyrev |
| 2016/0048235 A1 | 2/2016 | Poupyrev |
| 2016/0048236 A1 | 2/2016 | Poupyrev |
| 2016/0054792 A1 | 2/2016 | Poupyrev |
| 2016/0054803 A1 | 2/2016 | Poupyrev |
| 2016/0054804 A1* | 2/2016 | Gollakata .............. G06F 3/017 345/156 |
| 2016/0055201 A1 | 2/2016 | Poupyrev et al. |
| 2016/0090839 A1 | 3/2016 | Stolarcyzk |
| 2016/0098089 A1 | 4/2016 | Poupyrev |
| 2016/0100166 A1 | 4/2016 | Dragne et al. |
| 2016/0103500 A1 | 4/2016 | Hussey et al. |
| 2016/0106328 A1 | 4/2016 | Mestha et al. |
| 2016/0145776 A1 | 5/2016 | Roh |
| 2016/0170491 A1 | 6/2016 | Jung |
| 2016/0171293 A1 | 6/2016 | Li et al. |
| 2016/0186366 A1 | 6/2016 | McMaster |
| 2016/0216825 A1 | 7/2016 | Forutanpour |
| 2016/0249698 A1 | 9/2016 | Berzowska et al. |
| 2016/0253044 A1 | 9/2016 | Katz |
| 2016/0259037 A1 | 9/2016 | Molchanov et al. |
| 2016/0282988 A1 | 9/2016 | Poupyrev |
| 2016/0283101 A1 | 9/2016 | Schwesig et al. |
| 2016/0284436 A1 | 9/2016 | Fukuhara et al. |
| 2016/0299526 A1 | 10/2016 | Inagaki et al. |
| 2016/0320853 A1 | 11/2016 | Lien et al. |
| 2016/0320854 A1 | 11/2016 | Lien et al. |
| 2016/0345638 A1 | 12/2016 | Robinson et al. |
| 2016/0349790 A1 | 12/2016 | Connor |
| 2016/0349845 A1 | 12/2016 | Poupyrev et al. |
| 2016/0377712 A1 | 12/2016 | Wu et al. |
| 2017/0052618 A1 | 2/2017 | Lee et al. |
| 2017/0060254 A1 | 3/2017 | Molchanov et al. |
| 2017/0060298 A1 | 3/2017 | Hwang et al. |
| 2017/0075481 A1 | 3/2017 | Chou et al. |
| 2017/0075496 A1 | 3/2017 | Rosenberg et al. |
| 2017/0097413 A1 | 4/2017 | Gillian et al. |
| 2017/0097684 A1 | 4/2017 | Lien |
| 2017/0115777 A1 | 4/2017 | Poupyrev |
| 2017/0125940 A1 | 5/2017 | Karagozler et al. |
| 2017/0192523 A1 | 7/2017 | Poupyrev |
| 2017/0196513 A1 | 7/2017 | Longinotti-Buitoni et al. |
| 2017/0232538 A1 | 8/2017 | Robinson et al. |
| 2017/0233903 A1 | 8/2017 | Jeon |
| 2017/0249033 A1 | 8/2017 | Podhajny et al. |
| 2017/0322833 A1 | 11/2017 | Shen et al. |
| 2017/0325337 A1 | 11/2017 | Karagozler et al. |
| 2017/0325518 A1 | 11/2017 | Poupyrev et al. |
| 2017/0329425 A1 | 11/2017 | Karagozler et al. |
| 2018/0004301 A1 | 1/2018 | Poupyrev |
| 2018/0005766 A1 | 1/2018 | Fairbanks et al. |
| 2018/0046258 A1 | 2/2018 | Poupyrev |
| 2018/0157330 A1 | 6/2018 | Gu et al. |
| 2018/0196527 A1 | 7/2018 | Poupyrev et al. |

FOREIGN PATENT DOCUMENTS

| | | |
|---|---|---|
| DE | 102011075725 | 11/2012 |
| DE | 102013201359 | 7/2014 |
| EP | 0161895 | 11/1985 |
| EP | 1815788 | 8/2007 |
| GB | 2070469 | 9/1981 |
| GB | 2443208 | 4/2008 |
| JP | 2003280049 | 10/2003 |
| JP | 2006234716 | 9/2006 |
| JP | 2011102457 | 5/2011 |
| WO | WO-0130123 | 4/2001 |
| WO | WO-2001027855 | 4/2001 |
| WO | WO-0175778 | 10/2001 |
| WO | WO-2002082999 | 10/2002 |
| WO | WO-2005033387 | 4/2005 |
| WO | 2007125298 | 11/2007 |
| WO | WO-2008061385 | 5/2008 |
| WO | WO-2009032073 | 3/2009 |
| WO | 2009083487 | 7/2009 |
| WO | WO-2010032173 | 3/2010 |
| WO | WO-2012026013 | 3/2012 |
| WO | WO-2012152476 | 11/2012 |
| WO | WO-2013082806 | 6/2013 |
| WO | WO-2013084108 | 6/2013 |
| WO | WO-2013186696 | 12/2013 |
| WO | WO-2013191657 | 12/2013 |
| WO | WO-2014019085 | 2/2014 |
| WO | WO-2014116968 | 7/2014 |
| WO | WO-2014136027 | 9/2014 |
| WO | WO-2014138280 | 9/2014 |
| WO | WO-2014160893 | 10/2014 |
| WO | WO-2014165476 | 10/2014 |
| WO | WO-2014204323 | 12/2014 |
| WO | WO-2015017931 | 2/2015 |
| WO | WO-2015022671 | 2/2015 |
| WO | 2016053624 | 4/2016 |
| WO | 20170200949 | 11/2017 |
| WO | 2018106306 | 6/2018 |

OTHER PUBLICATIONS

"International Search Report and Written Opinion", Application No. PCT/US2016/024289, dated Aug. 25, 2016, 17 pages.

"Non-Final Office Action", U.S. Appl. No. 14/518,863, dated Oct. 14, 2016, 16 pages.

"Notice of Allowance", U.S. Appl. No. 14/312,486, dated Oct. 7, 2016, 15 pages.

"Notice of Allowance", U.S. Appl. No. 14/582,896, dated Nov. 7, 2016, 5 pages.

"Pre-Interview Communication", U.S. Appl. No. 14/513,875, dated Oct. 21, 2016, 3 pages.

Cheng,"Smart Textiles: From Niche to Mainstream", IEEE Pervasive Computing, Jul. 2013, pp. 81-84.

Farringdon,"Wearable Sensor Badge & Sensor Jacket for Context Awareness", Third International Symposium on Wearable Computers, Oct. 1999, 7 pages.

Pu,"Gesture Recognition Using Wireless Signals", Oct. 2014, pp. 15-18.

Schneegass,"Towards a Garment OS: Supporting Application Development for Smart Garments", Wearable Computers, ACM, Sep. 2014, 6 pages.

"Corrected Notice of Allowance", U.S. Appl. No. 14/582,896, dated Feb. 23, 2017, 2 pages.

"International Preliminary Report on Patentability", Application No. PCT/US2015/043963, dated Feb. 16, 2017, 12 pages.

"International Preliminary Report on Patentability", Application No. PCT/US2015/030388, dated Dec. 15, 2016, 12 pages.

"International Preliminary Report on Patentability", Application No. PCT/US2015/043949, dated Feb. 16, 2017, 13 pages.

"International Preliminary Report on Patentability", Application No. PCT/US2015/044774, dated Mar. 2, 2017, 8 pages.

"International Search Report and Written Opinion", Application No. PCT/US2016/062082, dated Feb. 23, 2017, 12 pages.

"International Search Report and Written Opinion", Application No. PCT/US2016/055671, dated Dec. 1, 2016, 14 pages.

"Non-Final Office Action", U.S. Appl. No. 14/513,875, dated Feb. 21, 2017, 9 pages.

"Non-Final Office Action", U.S. Appl. No. 14/874,955, dated Feb. 27, 2017, 8 pages.

"Non-Final Office Action", U.S. Appl. No. 15/398,147, date Mar. 9, 2017, 10 pages.

"Pre-Interview Communication", U.S. Appl. No. 14/959,730, dated Feb. 15, 2017, 3 pages.

Stoppa,"Wearable Electronics and Smart Textiles: A Critical Review", In Proceedings of Sensors, vol. 14, Issue 7, Jul. 7, 2014, pp. 11957-11992.

(56) References Cited

OTHER PUBLICATIONS

"Cardiio", Retrieved from: <http://www.cardiio.com/> Apr. 15, 2015 App Information Retrieved From: <https://itunes.apple.com/us/app/cardiio-touchless-camera-pulse/id542891434?Is=1&mt=8> Apr. 15, 2015, Feb. 24, 2015, 6 pages.
"Extended European Search Report", EP Application No. 15170577.9, dated Nov. 5, 2015, 12 pages.
"Final Office Action", U.S. Appl. No. 14/312,486, dated Jun. 3, 2016, 32 pages.
"Final Office Action", U.S. Appl. No. 14/504,038, dated Sep. 27, 2016, 23 pages.
"Final Office Action", U.S. Appl. No. 14/504,061, dated Mar. 9, 2016, 10 pages.
"Frogpad Introduces Wearable Fabric Keyboard with Bluetooth Technology", Retrieved From: <http://www.geekzone.co.nz/content.asp?contentid=3898> Mar. 16, 2015, Jan. 7, 2005, 2 pages.
"International Search Report and Written Opinion", Application No. PCT/US2015/044774, dated Nov. 3, 2015, 12 pages.
"International Search Report and Written Opinion", Application No. PCT/US2016/024267, dated Jun. 20, 2016, 13 pages.
"International Search Report and Written Opinion", Application No. PCT/US2016/024273, dated Jun. 20, 2016, 13 pages.
"International Search Report and Written Opinion", Application No. PCT/US2016/032307, dated Aug. 25, 2016, 13 pages.
"International Search Report and Written Opinion", Application No. PCT/US2016/029820, dated Jul. 15, 2016, 14 pages.
"International Search Report and Written Opinion", Application No. PCT/US2016/030177, dated Aug. 2, 2016, 15 pages.
"International Search Report and Written Opinion", Application No. PCT/US2015/043963, dated Nov. 24, 2015, 16 pages.
"International Search Report and Written Opinion", Application No. PCT/US2015/050903, dated Feb. 19, 2016, 18 pages.
"International Search Report and Written Opinion", Application No. PCT/US2016/030115, dated Aug. 8, 2016, 18 pages.
"International Search Report and Written Opinion", Application No. PCT/US2015/043949, dated Dec. 1, 2015, 18 pages.
"Non-Final Office Action", U.S. Appl. No. 14/312,486, dated Oct. 23, 2015, 25 pages.
"Non-Final Office Action", U.S. Appl. No. 14/504,038, dated Feb. 26, 2016, 22 pages.
"Non-Final Office Action", U.S. Appl. No. 14/504,061, dated Nov. 4, 2015, 8 pages.
"Non-Final Office Action", U.S. Appl. No. 14/582,896, dated Jun. 29, 2016, 9 pages.
"Non-Final Office Action", U.S. Appl. No. 14/666,155, dated Aug. 24, 2016, 9 pages.
"Non-Final Office Action", U.S. Appl. No. 14/681,625, dated Aug. 12, 2016, 9 pages.
"Non-Final Office Action", U.S. Appl. No. 14/930,220, dated Sep. 14, 2016, 15 pages.
"Notice of Allowance", U.S. Appl. No. 14/504,061, dated Sep. 12, 2016, 7 pages.
"Philips Vital Signs Camera", Retrieved From: <http://www.vitalsignscamera.com/> Apr. 15, 2015, Jul. 17, 2013, 2 pages.
"Restriction Requirement", U.S. Appl. No. 14/666,155, Jul. 22, 2016, 5 pages.
"The Instant Blood Pressure app estimates blood pressure with your smartphone and our algorithm", Retrieved at: http://www.instantbloodpressure.com/—on Jun. 23, 2016, 6 pages.
Arbabian,"A 94GHz mm-Wave to Baseband Pulsed-Radar for Imaging and Gesture Recognition", 2012 IEEE, 2012 Symposium on VLSI Circuits Digest of Technical Papers, 2012, 2 pages.
Balakrishnan,"Detecting Pulse from Head Motions in Video", In Proceedings: CVPR '13 Proceedings of the 2013 IEEE Conference on Computer Vision and Pattern Recognition Available at: <http://people.csail.mit.edu/mrub/vidmag/papers/Balakrishnan_Detecting_Pulse_from_2013_CVPR_paper.pdf>, Jun. 23, 2013, 8 pages.
Couderc,"Detection of Atrial Fibrillation using Contactless Facial Video Monitoring", In Proceedings: Heart Rhythm Society, vol. 12, Issue 1 Available at: <http://www.heartrhythmjournal.com/article/S1547-5271(14)00924-2/pdf>, Jan. 2015, 7 pages.
Espina,"Wireless Body Sensor Network for Continuous Cuff-less Blood Pressure Monitoring", International Summer School on Medical Devices and Biosensors, 2006, Sep. 2006, 5 pages.
Godana,"Human Movement Characterization in Indoor Environment using GNU Radio Based Radar", Retrieved at: http://repository.tudelft.nl/islandora/object/uuid:414e1868-dd00-4113-9989-4c213f1f7094?collection=education, Nov. 30, 2009, 100 pages.
He,"A Continuous, Wearable, and Wireless Heart Monitor Using Head Ballistocardiogram (BCG) and Head Electrocardiogram (ECG) with a Nanowatt ECG Heartbeat Detection Circuit", In Proceedings: Thesis, Department of Electrical Engineering and Computer Science, Massachusetts Institute of Technology Available at: <http://dspace.mit.edu/handle/1721.1/79221>, Feb. 2013, 137 pages.
Holleis,"Evaluating Capacitive Touch Input on Clothes", Proceedings of the 10th International Conference on Human Computer Interaction, Jan. 1, 2008, 10 pages.
Nakajima,"Development of Real-Time Image Sequence Analysis for Evaluating Posture Change and Respiratory Rate of a Subject in Bed", In Proceedings: Physiological Measurement, vol. 22, No. 3 Retrieved From: <http://iopscience.iop.org/0967-3334/22/3/401/pdf/0967-3334_22_3_401.pdf> Feb. 27, 2015, Aug. 2001, 8 pages.
Patel,"Applications of Electrically Conductive Yarns in Technical Textiles", International Conference on Power System Technology (POWECON), Oct. 30, 2012, 6 pages.
Poh,"A Medical Mirror for Non-Contact Health Monitoring", In Proceedings: ACM SIGGRAPH Emerging Technologies Available at: <http://affect.media.mit.edu/pdfs/11.Poh-etal-SIGGRAPH.pdf>, 2011, 1 page.
Poh,"Non-contact, Automated Cardiac Pulse Measurements Using Video Imaging and Blind Source Separation.", In Proceedings: Optics Express, vol. 18, No. 10 Available at: <http://www.opticsinfobase.org/view_article.cfm?gotourl=http%3A%2F%2Fwww%2Eopticsinfobase%2Eorg%2FDirectPDFAccess%2F77B04D55%2DBC95%2D6937%2D5BAC49A426378C02%5F199381%2Foe%2D18%2D10%2D10762%2Ep, May 7, 2010, 13 pages.
Pu,"Whole-Home Gesture Recognition Using Wireless Signals", MobiCom '13 Proceedings of the 19th annual international conference on Mobile computing & networking, Aug. 27, 2013, 12 pages.
Wang,"Exploiting Spatial Redundancy of Image Sensor for Motion Robust rPPG", In Proceedings: IEEE Transactions on Biomedical Engineering, vol. 62, Issue 2, Jan. 19, 2015, 11 pages.
Wang,"Micro-Doppler Signatures for Intelligent Human Gait Recognition Using a UWB Impulse Radar", 2011 IEEE International Symposium on Antennas and Propagation (APSURSI), Jul. 3, 2011, pp. 2103-2106.
Wijesiriwardana,"Capacitive Fibre-Meshed Transducer for Touch & Proximity Sensing Applications", IEEE Sensors Journal, IEEE Service Center, Oct. 1, 2005, 5 pages.
Zhadobov,"Millimeter-wave Interactions with the Human Body: State of Knowledge and Recent Advances", International Journal of Microwave and Wireless Technologies, Mar. 1, 2011, 11 pages.
Zhang,"Study of the Structural Design and Capacitance Characteristics of Fabric Sensor", Advanced Materials Research (vols. 194-196), Feb. 21, 2011, 8 pages.
"Corrected Notice of Allowance", U.S. Appl. No. 14/312,486, dated Jan. 23, 2017, 4 pages.
"Corrected Notice of Allowance", U.S. Appl. No. 14/504,061, dated Dec. 27, 2016, 2 pages.
"Corrected Notice of Allowance", U.S. Appl. No. 14/582,896, dated Feb. 6, 2017, 2 pages.
"Corrected Notice of Allowance", U.S. Appl. No. 14/582,896, dated Dec. 19, 2016, 2 pages.
"Non-Final Office Action", U.S. Appl. No. 14/504,121, dated Jan. 9, 2017, 13 pages.
"Non-Final Office Action", U.S. Appl. No. 14/504,139, dated Jan. 27, 2017, 10 pages.
"Non-Final Office Action", U.S. Appl. No. 14/959,799, dated Jan. 27, 2017, 10 pages.
"Notice of Allowance", U.S. Appl. No. 14/930,220, dated Feb. 2, 2017, 8 pages.

(56) References Cited

OTHER PUBLICATIONS

"Pre-Interview Communication", U.S. Appl. No. 14/494,863, dated Jan. 27, 2017, 5 pages.
"Pre-Interview Communication", U.S. Appl. No. 14/959,901, dated Feb. 10, 2017, 3 pages.
"Combined Search and Examination Report", GB Application No. 1620892.8, dated Apr. 6, 2017, 5 pages.
"Combined Search and Examination Report", GB Application No. 1620891.0, dated May 31, 2017, 9 pages.
"Corrected Notice of Allowance", U.S. Appl. No. 14/930,220, dated Mar. 20, 2017, 2 pages.
"Corrected Notice of Allowance", U.S. Appl. No. 14/930,220, dated May 11, 2017, 2 pages.
"Final Office Action", U.S. Appl. No. 14/518,863, dated May 5, 2017, 18 pages.
"First Action Interview Office Action", U.S. Appl. No. 14/959,901, dated Apr. 14, 2017, 3 pages.
"International Preliminary Report on Patentability", Application No. PCT/US2015/050903, dated Apr. 13, 2017, 12 pages.
"International Search Report and Written Opinion", Application No. PCT/US2016/060399, dated Jan. 30, 2017, 11 pages.
"International Search Report and Written Opinion", Application No. PCT/US2016/063874, dated May 11, 2017, 19 pages.
"Non-Final Office Action", U.S. Appl. No. 15/403,066, dated May 4, 2017, 31 pages.
"Non-Final Office Action", U.S. Appl. No. 14/504,038, dated Mar. 22, 2017, 33 pages.
"Notice of Allowance", U.S. Appl. No. 14/494,863, dated May 30, 2017, 7 pages.
"Pre-Interview Communication", U.S. Appl. No. 15/343,067, dated Apr. 19, 2017, 3 pages.
"Textile Wire Brochure", Retrieved at: http://www.textile-wire.ch/en/home.html, Aug. 7, 2004, 17 pages.
Stoppa, Matteo , "Wearable Electronics and Smart Textiles: A Critical Review", In Proceedings of Sensors, vol. 14, Issue 7, Jul. 7, 2014, pp. 11957-11992.
"Advisory Action", U.S. Appl. No. 14/504,139, dated Aug. 28, 2017, 3 pages.
"Final Office Action", U.S. Appl. No. 15/398,147, dated Jun. 30, 2017, 11 pages.
"Final Office Action", U.S. Appl. No. 14/874,955, dated Jun. 30, 2017, 9 pages.
"Final Office Action", U.S. Appl. No. 14/959,799, dated Jul. 19, 2017, 12 pages.
"Final Office Action", U.S. Appl. No. 14/504,121, dated Aug. 8, 2017, 16 pages.
"Final Office Action", U.S. Appl. No. 14/959,901, dated Aug. 25, 2017, 19 pages.
"Final Office Action", U.S. Appl. No. 15/403,066, dated Oct. 5, 2017, 31 pages.
"Final Office Action", U.S. Appl. No. 14/959,730, dated Nov. 22, 2017, 16 pages.
"Non-Final Office Action", U.S. Appl. No. 14/862,409, dated Jun. 22, 2017, 15 pages.
"Non-Final Office Action", U.S. Appl. No. 14/959,730, dated Jun. 23, 2017, 14 pages.
"Non-Final Office Action", U.S. Appl. No. 15/093,533, dated Aug. 24, 2017, 18 pages.
"Non-Final Office Action", U.S. Appl. No. 14/959,799, dated Sep. 8, 2017, 16 pages.
"Non-Final Office Action", U.S. Appl. No. 15/398,147, dated Sep. 8, 2017, 7 pages.
"Non-Final Office Action", U.S. Appl. No. 14/518,863, dated Sep. 29, 2017, 20 pages.
"Non-Final Office Action", U.S. Appl. No. 15/142,689, dated Oct. 4, 2017, 18 pages.
"Non-Final Office Action", U.S. Appl. No. 14/504,139, dated Oct. 18, 2017, 12 pages.
"Non-Final Office Action", U.S. Appl. No. 15/595,649, dated Oct. 31, 2017, 16 pages.
"Notice of Allowance", U.S. Appl. No. 14/513,875, dated Jun. 28, 2017, 7 pages.
"Notice of Allowance", U.S. Appl. No. 15/343,067, dated Jul. 27, 2017, 9 pages.
"Notice of Allowance", U.S. Appl. No. 14/504,038, dated Aug. 7, 2017, 17 pages.
"Notice of Allowance", U.S. Appl. No. 14/874,955, dated Oct. 20, 2017, 7 pages.
"Notice of Allowance", U.S. Appl. No. 15/398,147, dated Nov. 15, 2017, 8 pages.
"Pre-Interview Office Action", U.S. Appl. No. 14/862,409, dated Sep. 15, 2017, 16 pages.
"Preliminary Report on Patentability", PCT Application No. PCT/US2016/030115, dated Oct. 31, 2017, 15 pages.
"Written Opinion", PCT Application No. PCT/US2017/032733, dated Jul. 26, 2017, 5 pages.
"Final Office Action", U.S. Appl. No. 15/093,533, dated Mar. 21, 2018, 19 pages.
"Final Office Action", U.S. Appl. No. 14/518,863, dated Apr. 5, 2018, 21 pages.
"Final Office Action", U.S. Appl. No. 14/504,139, dated May 1, 2018, 14 pages.
"First Action Interview Office Action", U.S. Appl. No. 15/286,152, dated Mar. 1, 2018, 5 pages.
"First Action Interview Office Action", U.S. Appl. No. 15/166,198, dated Apr. 25, 2018, 8 pages.
"Foreign Office Action", Chinese Application No. 201721290290.3, dated Mar. 9, 2018, 2 pages.
"Non-Final Office Action", U.S. Appl. No. 15/287,253, dated Apr. 5, 2018, 17 pages.
"Notice of Allowance", U.S. Appl. No. 14/959,730, dated Feb. 22, 2018, 8 pages.
"Pre-Interview Communication", U.S. Appl. No. 15/166,198, dated Mar. 8, 2018, 8 pages.
"Pre-Interview Communication", U.S. Appl. No. 15/362,359, dated May 17, 2018, 4 pages.
"Written Opinion", PCT Application No. PCT/US2017/032733, dated Jul. 24, 2017, 5 pages.
"Final Office Action", U.S. Appl. No. 14/969,799, dated Jan. 4, 2018, 17 pages.
"International Search Report and Written Opinion", PCT/US2017/047691, dated Nov. 16, 2017, 13 pages.
"International Search Report and Written Opinion", PCT Application No. PCT/US2017/051663, dated Nov. 29, 2017. 16 pages.
"Non-Final Office Action", U.S. Appl. No. 14/504,121, dated Jan. 2, 2018, 19 pages.
"Non-Final Office Action", U.S. Appl. No. 14/959,901, dated Jan. 8, 2018, 21 pages.
"Non-Final Office Action", U.S. Appl. No. 14/862,409, dated Dec. 14, 2017, 17 pages.
"Non-Final Office Action", U.S. Appl. No. 15/267,181, dated Feb. 8, 2018, 29 pages.
"Non-Final Office Action", U.S. Appl. No. 14/874.955, dated Feb. 8, 2018, 7 pages.
"Notice of Allowance", U.S. Appl. No. 15/403,086, dated Jan. 8, 2018, 18 pages.
"Pre-Interview First Office Action", U.S. Appl. No. 15/286,152, dated Feb. 8, 2018, 4 pages.
"Restriction Requirement", U.S. Appl. No. 15/382,359, dated Jan. 8, 2018, 5 pages.
Bondade, et al., "A linear-assisted DC-DC hybrid power converter for envelope tracking RF power amplifiers", 2014 IEEE Energy Conversion Congress and Exposition (ECCE), IEEE, Sep. 14, 2014, pp. 5769-5773, XP032680873, DOI: 10.1109/ECCE.2014.6954193, Sep. 14, 2014, 5 pages.
Fan, et al., "Wireless Hand Gesture Recognition Based on Continuous-Wave Doppler Radar Sensors", IEEE Transactions on Microwave Theory and Techniques. Plenum, USA, vol. 64, No. 11, Nov. 1, 2016 (Nov. 1, 2016), pp. 4012-4012, XP011633246, ISSN: 0018-9480, DOI: 10.1109/TMTT.2016.2610427, Nov. 1, 2016, 9 pages.
Lien, et al., "Soli: Ubiquitous Gesture Sensing with Millimeter Wave Radar", ACM Transactions on Graphics (TOG), ACM, US,

(56) References Cited

OTHER PUBLICATIONS vol. 35, No. 4, Jul. 11, 2016 (Jul. 11, 2016), pp. 1-19, XP058275791, ISSN; 0730-0301, DOI: 10.1145/2897824.2925953, Jul. 11, 2016, 19 pages.

Martinez-Garcia, et al., "Four-quadrant linear-assisted DC/DC voltage regulator", Analog Integrated Circuits and Signal Processing, Springer New York LLC, US, vol. 88, No. 1, Apr. 23, 2016 (Apr. 23, 2016), pp. 151-160, XP035898949, ISSN: 0925-1030, DOI: 10.1007/S10470-016-0747-8, Apr. 23, 2016, 10 pages.

Skolnik, "CW and Frequency-Modulated Radar", In: "Introduction to Radar Systems", Jan. 1, 1981 (Jan. 1, 1981), McGraw Hill, XP055047545, ISBN: 978-0-07-057909-5 pp. 68-100, p. 95-p. 97, Jan. 1, 1981. 18 pages.

Zheng, et al., "Doppler Bio-Signal Detection Based Time-Domain Hand Gesture Recognition", 2013 IEEE MTT-S International Microwave Workshop Series on RF and Wireless Technologies for Biomedical and Healthcare Applications (IMWS-BIO). IEEE, Dec. 9, 2013 (Dec. 9, 2013), p. 3, XP032574214, DOI: 10.1109/IMWS-BIO.2013.6756200, Dec. 9, 2013, 3 pages.

"Final Office Action", U.S. Appl. No. 15/595,649, dated May 23, 2018, 13 pages.

"Final Office Action", U.S. Appl. No. 15/142,689, dated Jun. 1, 2018, 16 pages.

"Final Office Action", U.S. Appl. No. 14/874,955, dated Jun. 11, 2018, 9 pages.

"Final Office Action", U.S. Appl. No. 14/959,901, dated Jun. 15, 2018, 21 pages.

"Final Office Action", U.S. Appl. No. 15/286,152, dated Jun. 26, 2018, 25 pages.

"Final Office Action", U.S. Appl. No. 15/267,181, dated Jun. 7, 2018, 31 pages.

"Final Office Action", U.S. Appl. No. 14/504,121, dated Jul. 9, 2018, 23 pages.

"Foreign Office Action", Chinese Application No. 201721290290.3, dated Jun. 6, 2018, 3 pages.

"Non-Final Office Action", U.S. Appl. No. 15/586,174, dated Jun. 18, 2018, 7 pages.

"Non-Final Office Action", U.S. Appl. No. 15/286,512, dated Jul. 19, 2018, 15 pages.

"Non-Final Office Action", U.S. Appl. No. 15/142,829, dated Aug. 16, 2018, 15 pages.

"Notice of Allowance", U.S. Appl. No. 15/362,359, dated Aug. 3, 2018, 8 pages.

"Notice of Allowance", U.S. Appl. No. 14/862,409, dated Jun. 6, 2018, 7 pages.

"Pre-Interview Communication", U.S. Appl. No. 15/287,359, dated Jul. 24, 2018, 2 pages.

"Corrected Notice of Allowance", U.S. Appl. No. 15/362,359, dated Sep. 17, 2018, 10 pages.

"Final Office Action", U.S. Appl. No. 15/166,198, dated Sep. 27, 2018, 33 pages.

"Non-Final Office Action", U.S. Appl. No. 15/287,253, dated Sep. 7, 2018, 20 pages.

"Non-Final Office Action", U.S. Appl. No. 14/504,139, dated Oct. 5, 2018, 16 pages.

"Notice of Allowance", U.S. Appl. No. 14/874,955, dated Oct. 4, 2018, 8 pages.

"Notice of Allowance", U.S. Appl. No. 15/595,649, dated Sep. 14, 2018, 8 pages.

"Notice of Allowance", U.S. Appl. No. 15/586,174, dated Sep. 24, 2018, 5 pages.

"Pre-Interview Communication", U.S. Appl. No. 15/286,495, dated Sep. 10, 2018, 4 pages.

"Restriction Requirement", U.S. Appl. No. 15/286,537, dated Aug. 27, 2018, 8 pages.

\* cited by examiner

WIDE-FIELD RADAR-BASED GESTURE RECOGNITION

RELATED APPLICATION

This application claims priority to U.S. Provisional Patent Application Ser. No. 62/155,357 filed Apr. 30, 2015, the disclosure of which is incorporated by reference herein in its entirety.

BACKGROUND

Small-screen computing devices continue to proliferate, such as smartphones and computing bracelets, rings, and watches. Like many computing devices, these small-screen devices often use virtual keyboards to interact with users. On these small screens, however, many people find interacting through virtual keyboards to be difficult, as they often result in slow and inaccurate inputs. This frustrates users and limits the applicability of small-screen computing devices. This problem has been addressed in part through screen-based gesture recognition techniques. These screen-based gestures, however, still struggle from substantial usability issues due to the size of these screens.

To address this problem, optical finger- and hand-tracking techniques have been developed, which enable gesture tracking not made on the screen. These optical techniques, however, have been large, costly, or inaccurate thereby limiting their usefulness in addressing usability issues with small-screen computing devices.

One other manner has recently been developed where gestures are tracked using radar. Current radar techniques, however, often require a large antenna array and suffer from numerous practical difficulties. These large antenna arrays use thin-beam scanning techniques to locate a large number of points in space, including points of a human action (e.g., fingers, arm, or hand). These techniques track these points of a human action and the other points in space and then determine which points are associated with the human action and which are not. With these action points determined, the techniques track their movement and, based on these movements of the points of the action, reconstruct the action throughout the movement. With this reconstructed movement, the techniques then determine a gesture associated with those movements. This permits some rudimentary gesture recognition but is limited by the large antenna array and the computational difficulties and resource requirements inherent in using thin-beam scanning techniques.

SUMMARY

This document describes techniques and devices for wide-field radar-based gesture recognition. These techniques and devices can accurately recognize gestures that are made in three dimensions, such as non-screen or "in-the-air" gestures. These in-the-air gestures can be made from varying distances, such as from a person sitting on a couch to control a television, a person standing in a kitchen to control an oven or refrigerator, or centimeters from a computing watch's small-screen display.

This summary is provided to introduce simplified concepts concerning wide-field radar-based gesture recognition, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for wide-field radar-based gesture recognition are described with reference to the following drawings. The same numbers are used throughout the drawings to reference like features and components.

DETAILED DESCRIPTION

Overview

This document describes techniques and devices enabling wide-field radar-based gesture recognition. These techniques and devices enable a great breadth of gestures and uses for those gestures, such as gestures to use, control, and interact with various devices, from smartphones to refrigerators. The techniques and devices are capable of providing a wide radar field that can sense gestures using relatively small radar systems, even those that can be included within small devices. Furthermore, these techniques need not track and reconstruct points of a human action to determine gestures, which has various advantages described below.

This document now turns to an example environment, after which example wide-field radar-based gesture-recognition systems and radar fields, example methods, example techniques and devices for development of hardware abstraction modules, and an example computing system are described.

Example Environment

Figure 1:
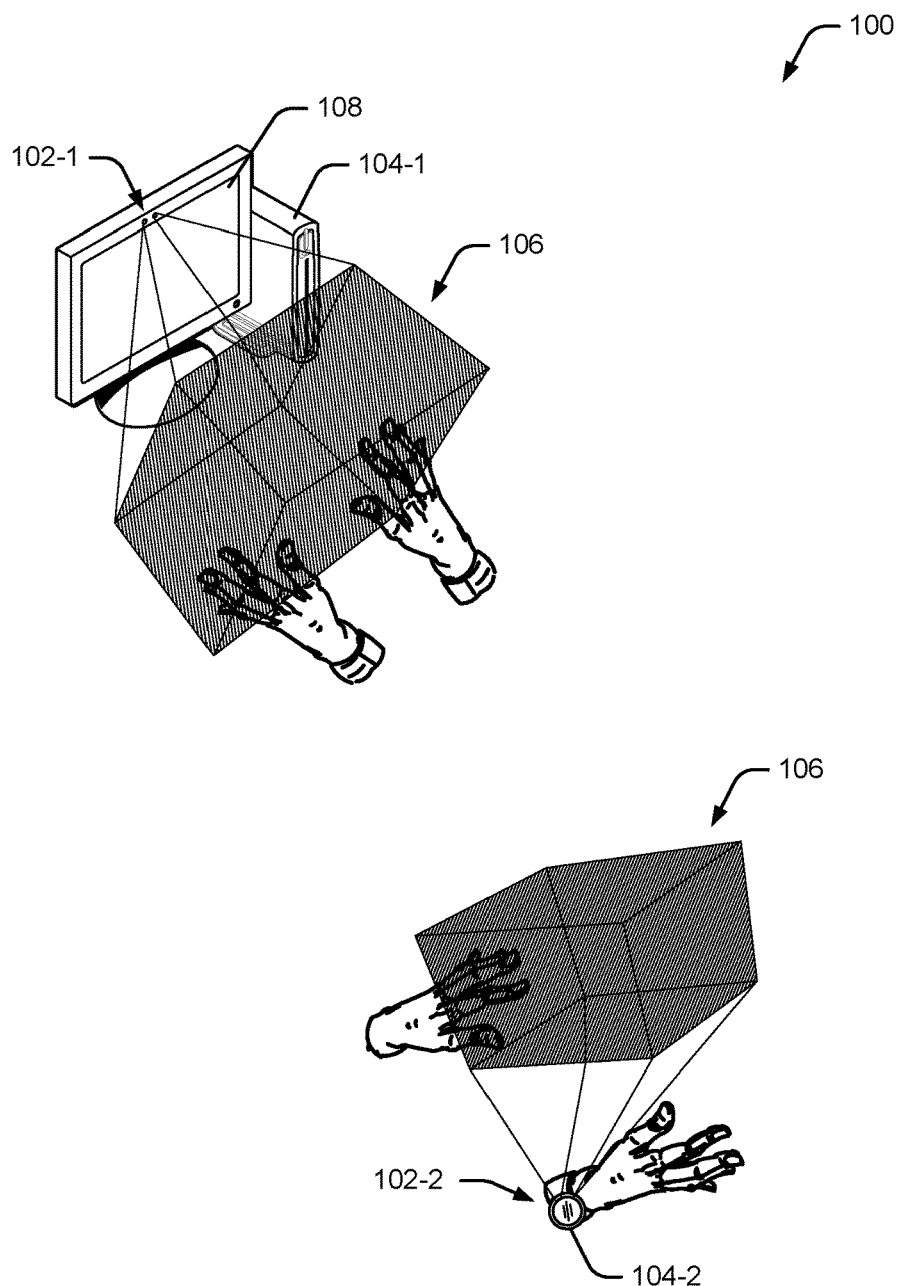
FIG. 1 illustrates an example environment in which wide-field radar-based gesture recognition can be implemented.

FIG. 1 is an illustration of example environment 100 in which techniques using, and an apparatus including, a wide-field radar-based gesture-recognition system 102 may be embodied. Environment 100 includes two example devices and techniques for using wide-field radar-based gesture-recognition system 102, in the first, wide-field radar-based gesture-recognition system 102-1 provides a radar field of intermediate size to interact with one of computing devices 104, desktop computer 104-1, and in the second, wide-field radar-based gesture-recognition system 102-2 provides a radar field of small size to interact with computing watch 104-2.

Desktop computer 104-1 includes, or is associated with, wide-field radar-based gesture-recognition system 102-1. These devices work together to improve user interaction with desktop computer 104-1. Assume, for example, that desktop computer 104-1 includes a touch screen 108 through which display and user interaction can be performed. This touch screen 108 can present some challenges to users, such as needing a person to sit in a particular orientation, such as upright and forward, to be able to touch the screen. Further, the size for selecting controls through touch screen 108 can make interaction difficult and time-consuming for some users. Consider, however, wide-field radar-based gesture-recognition system 102-1, which provides radar field 106-1 enabling a user's hands to interact with desktop computer 104-1, such as with small or large, simple or complex gestures, including those with one or two hands, and in three dimensions. As is readily apparent, a large volume through which a user may make selections can be substantially easier and provide a better experience over a flat surface, such as that of touch screen 108.

Similarly, consider wide-field radar-based gesture-recognition system 102-2, which provides radar field 106-2, which enables a user to interact with computing watch 104-2 from a near distance, enabling finger, hand, and arm gestures. By so doing, user selections can be made simpler and easier than a small screen of a small computing device, such as that of computing watch 104-2.

Wide-field radar-based gesture-recognition systems 102 can interact with applications or an operating system of computing devices 104, or remotely through a communication network by transmitting input responsive to recognizing gestures. Gestures can be mapped to various applications and devices, thereby enabling control of many devices and applications. Many complex and unique gestures can be recognized by wide-field radar-based gesture-recognition systems 102, thereby permitting precise and/or single-gesture control, even for multiple applications. Wide-field radar-based gesture-recognition systems 102, whether integrated with a computing device, having computing capabilities, or having few computing abilities, can each be used to interact with various devices and applications.

Figure 2:
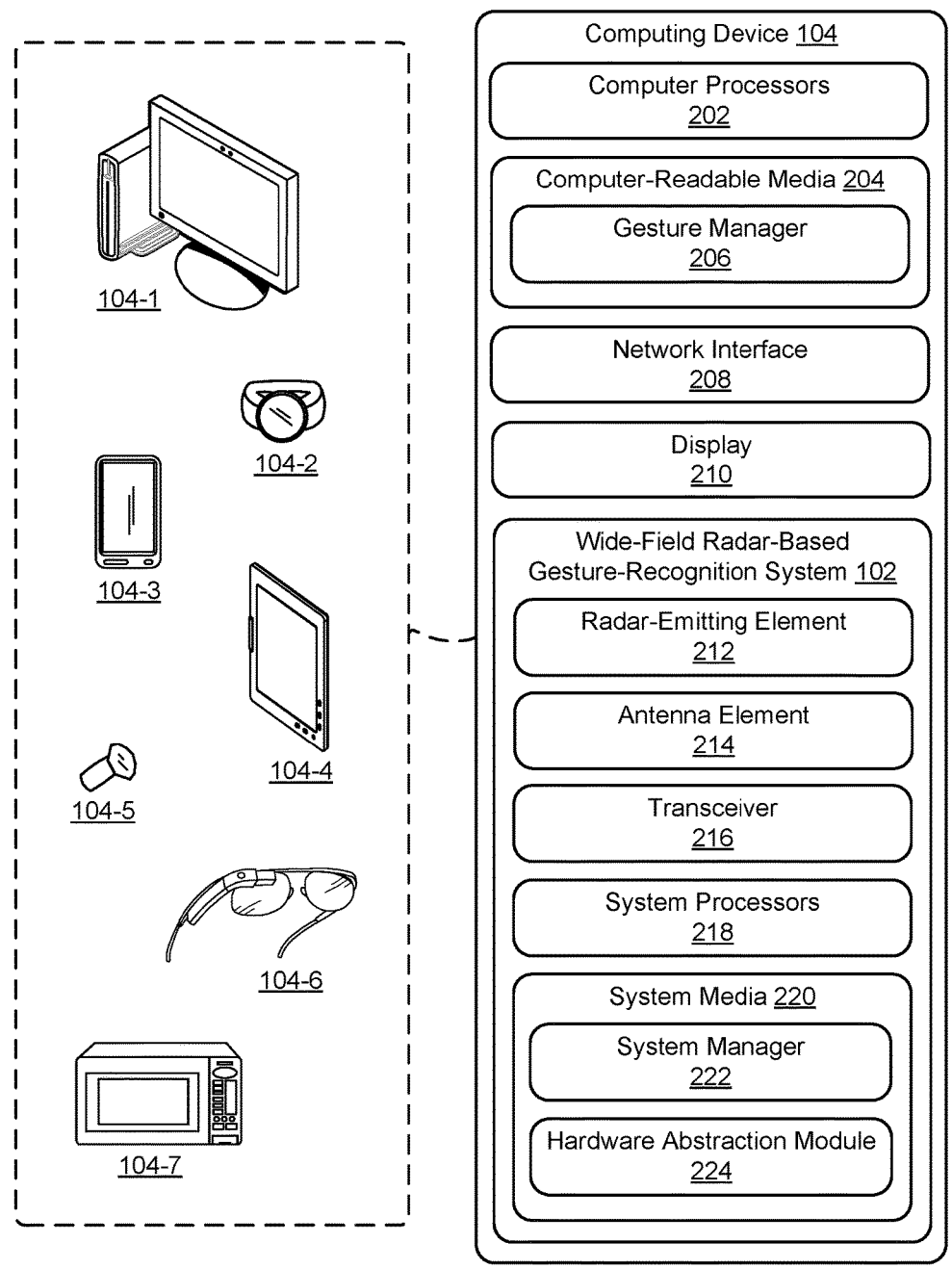
FIG. 2 illustrates the wide-field radar-based gesture-recognition system and computing device of FIG. 1 in detail.

In more detail, consider FIG. 2, which illustrates wide-field radar-based gesture-recognition system 102 as part of one of computing device 104. Computing device 104 is illustrated with various non-limiting example devices, the noted desktop computer 104-1, computing watch 104-2, as well as smartphone 104-3, tablet 104-4, computing ring 104-5, computing spectacles 104-6, and microwave 104-7, though other devices may also be used, such as home automation and control systems, entertainment systems, audio systems, other home appliances, security systems, netbooks, and e-readers. Note that computing device 104 can be wearable, non-wearable but mobile, or relatively immobile (e.g., desktops and appliances).

Note also that wide-field radar-based gesture-recognition system 102 can be used with, or embedded within, many different computing devices or peripherals, such as in walls of a home to control home appliances and systems (e.g., automation control panel), in automobiles to control internal functions (e.g., volume, cruise control, or even driving of the car), or as an attachment to a laptop computer to control computing applications on the laptop.

Further, radar fields 106 can be invisible and penetrate some materials, such as textiles, thereby further expanding how the wide-field radar-based gesture-recognition system 102 can be used and embodied. While examples shown herein generally show one wide-field radar-based gesture-recognition system 102 per device, multiples can be used, thereby increasing a number and complexity of gestures, as well as accuracy and robust recognition.

Computing device 104 includes one or more computer processors 202 and computer-readable media 204, which includes memory media and storage media. Applications and/or an operating system (not shown) embodied as computer-readable instructions on computer-readable media 204 can be executed by processors 202 to provide some of the functionalities described herein. Computer-readable media 204 also includes gesture manager 206 (described below).

Computing device 104 may also include network interfaces 208 for communicating data over wired, wireless, or optical networks and display 210. By way of example and not limitation, network interface 208 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like.

Wide-field radar-based gesture-recognition system 102, as noted above, is configured to sense gestures. To enable this, wide-field radar-based gesture-recognition system 102 includes a radar-emitting element 212 and an antenna element 214.

Generally, radar-emitting element 212 is configured to provide wide-field radar in contrast to narrow-beam-scanning radar fields. In one embodiment, a large contiguous field is used, rather than a beam-scanning field. The reflections in that field can then be received by one or multiple antennas. This reflection signal includes many signals and signal elements, and therefore may be referred to as a reflection signal or a set of reflection signals, but in both cases multiple signal elements are included. In one case, a large radar field and large-field reflections are received at one receiver but the signal received is processed by digitally breaking up the received reflections. The broken-up signals are then analyzed separately. This can be referred to as beam stealing though no beams are actually formed in the large radar field. Other digital processing may be used, such as phase arrays in which fields of different phases are admitted, each for analysis of the reflection signals.

In another embodiment multiple fields are used but from different directions or having other differences, such as different frequencies or phases, and which can be received by one or multiple dedicated receivers (e.g., antenna elements 214).

More specifically, these fields include numerous kinds of radar fields, such as those from continuous wave and pulsed radar systems, and may exclude phased antenna arrays. Pulsed radar systems are often of shorter transmit time and higher peak power, and include both impulse and chirped radar systems. Pulsed radar systems have a range based on time of flight and a velocity based on frequency shift. Chirped radar systems have a range based on time of flight (pulse compressed) and a velocity based on frequency shift.

Continuous wave radar systems are often of relatively longer transmit time and lower peak power. These continuous wave radar systems include single tone, linear frequency modulated (FM), and stepped FM types. Single tone radar systems have a very limited range based on the phase and a velocity based on frequency shift. Linear FM radar systems have a range based on frequency shift at a velocity also based on frequency shift. Stepped FM radar systems have a range based on phase or time of flight and a velocity based on frequency shift. While these five types of radar systems are noted herein, others may also be used, such as sinusoidal modulation scheme radar systems.

Radar fields provided by these types of radar systems vary from a small size, such as zero or one or so millimeters to 1.5 meters, or an intermediate size, such as about one to about 30 meters. In the intermediate size, antenna element 214 is configured to receive and process reflections of the radar field to provide large-body gestures based on reflections from human tissue caused by body, arm, or leg movements, though smaller and more-precise gestures can be sensed as well. Example intermediate-sized radar fields include those in which a user makes gestures to control a television from a couch, change a song or volume from a stereo across a room, turn off an oven or oven timer (a near field would also be useful), turn lights on or off in a room, and so forth.

Radar-emitting element 212 can instead be configured to provide a wide radar field from little if any distance from a computing device or its display, including radar fields that are a full contiguous field in contrast to beam-scanning radar field. Examples are illustrated in FIG. 1 with radar fields 106.

Radar-emitting element 212 can be configured to provide the wide-field radars of the various types set forth above. Antenna element 214 is configured to receive reflections of, or sense interactions in, the radar field. In some cases, reflections include those from human tissue that is within the radar field, such as a hand or arm movement. Antenna element 214 can include one or many antennas or sensors, such as an array of radiation sensors, the number in the array based on a desired resolution and whether the field is a surface or volume.

The field provided by radar-emitting element 212 can be a three-dimensional (3D) volume (e.g., hemisphere, cube, volumetric fan, cone, or cylinder) to sense in-the-air gestures, though a surface field (e.g., projecting on a surface of a person) can instead be used. Antenna element 214 is configured, in some cases, to receive reflections from interactions in the radar field of two or more targets (e.g., fingers, arms, or persons) and provide a composite signal.

Example radar fields 106 are illustrated in FIG. 1 in which a user may perform complex or simple gestures with his or her arm, body, finger, fingers, hand, or hands (or a device like a stylus) that interrupts the radar field. Example gestures include the many gestures usable with current touch-sensitive displays, such as swipes, two-finger pinch, spread, rotate, tap, and so forth. Other gestures are enabled that are complex, or simple but three-dimensional, examples include the many sign-language gestures, e.g., those of American Sign Language (ASL) and other sign languages worldwide. A few examples of these are: an up-and-down fist, which in ASL means "Yes"; an open index and middle finger moving to connect to an open thumb, which means "No"; a flat hand moving up a step, which means "Advance"; a flat and angled hand moving up and down; which means "Afternoon"; clenched fingers and open thumb moving to open fingers and an open thumb, which means "taxicab"; an index finger moving up in a roughly vertical direction, which means "up"; and so forth. These are but a few of many gestures that can be sensed as well as be mapped to particular devices or applications, such as the advance gesture to skip to another song on a web-based radio application, a next song on a compact disk playing on a stereo, or a next page or image in a file or album on a computer display or digital picture frame.

Returning to FIG. 2, wide-field radar-based gesture-recognition system 102 also includes a transmitting device configured to transmit a reflection signal to a remote device, though this need not be used when wide-field radar-based gesture-recognition system 102 is integrated with computing device 104. When included, the reflection signal can be provided in a format usable by a remote computing device sufficient for the remote computing device to determine the gesture in those cases where the gesture is not determined by wide-field radar-based gesture-recognition system 102 or computing device 104.

In more detail, radar-emitting element 212 can be configured to emit microwave radiation in a 1 GHz to 300 GHz range, a 3 GHz to 100 GHz range, and narrower bands, such as 57 GHz to 63 GHz, to provide the radar field. This range affects antenna element 214's ability to receive interactions, such as to follow locations of two or more targets to a resolution of about two to about 25 millimeters. Radar-emitting element 212 can be configured, along with other entities of wide-field radar-based gesture-recognition system 102, to have a relatively fast update rate, which can aid in resolution of the interactions.

By selecting particular frequencies, wide-field radar-based gesture-recognition system 102 can operate to substantially penetrate clothing while not substantially penetrating human tissue. Thus, a person wearing gloves or a long sleeve shirt that could interfere with sensing gestures with some conventional techniques, can still be sensed with wide-field radar-based gesture-recognition system 102.

Wide-field radar-based gesture-recognition system 102 may also include one or more system processors 218 and system media 220 (e.g., one or more computer-readable storage media). System media 220 includes system manager 222 and hardware abstraction module 224. System manager 222 can perform various operations, including determining a gesture based on the reflection signal, mapping the determined gesture to a pre-configured control gesture associated with a control input for an application associated with touch screen 108, and causing transceiver 216 to transmit the control input to the remote device effective to enable control of the application (if remote). This is but one of the ways in which the above-mentioned control through wide-field radar-based gesture-recognition system 102 can be enabled. Operations of system manager 222 are provided in greater detail as part of methods 300 and 500 below. Hardware abstraction module 224 is part of an alternative embodiment described in FIGS. 6 and 7 below.

These and other capabilities and configurations, as well as ways in which entities of FIGS. 1 and 2 act and interact, are set forth in greater detail below. These entities may be further divided, combined, and so on. The environment 100 of FIG. 1 and the detailed illustrations of FIG. 2 illustrate some of many possible environments and devices capable of employing the described techniques.

Example Methods

Figure 3:
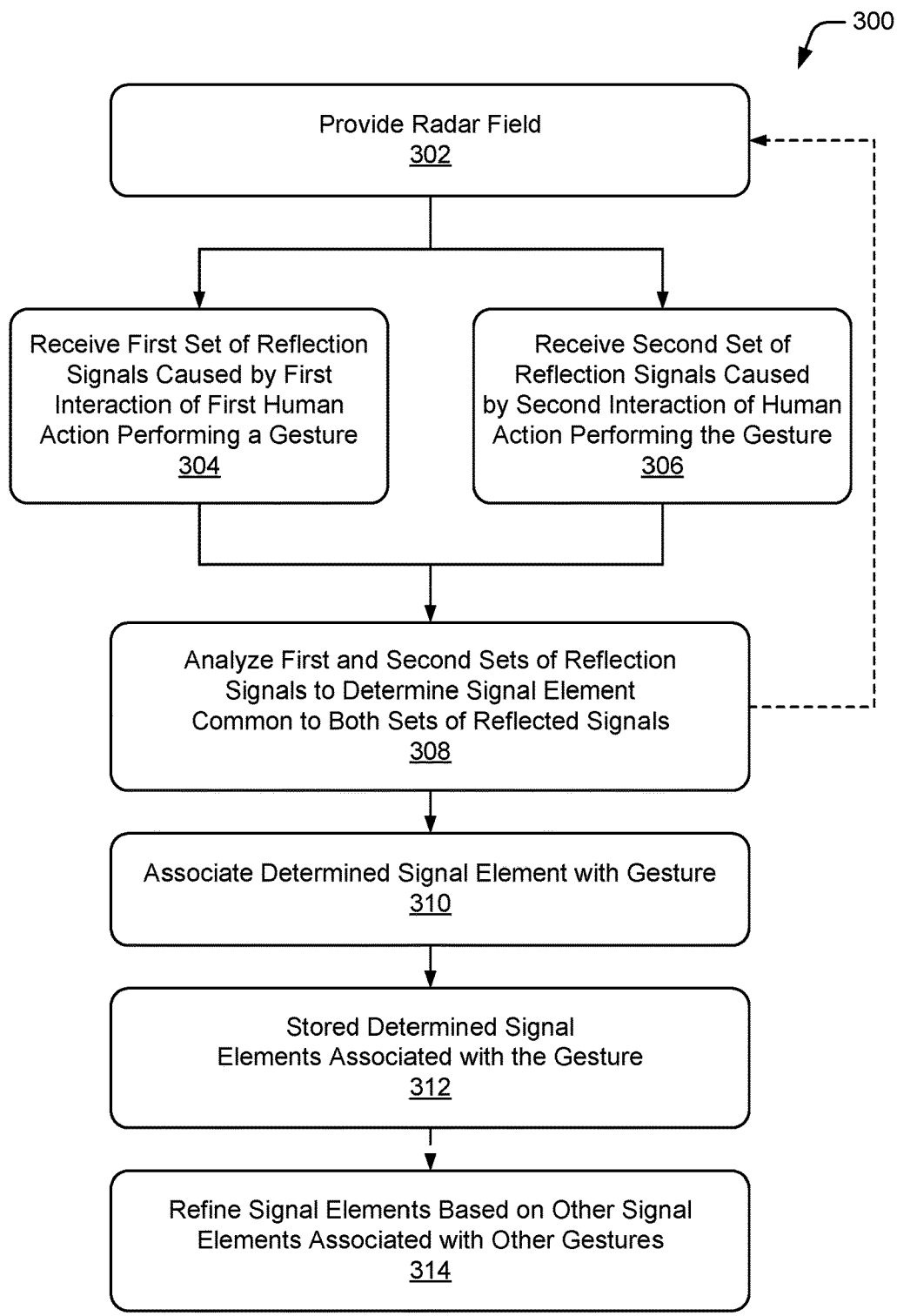
FIG. 3 illustrates an example method for determining signal elements for a gesture.
Figure 5:
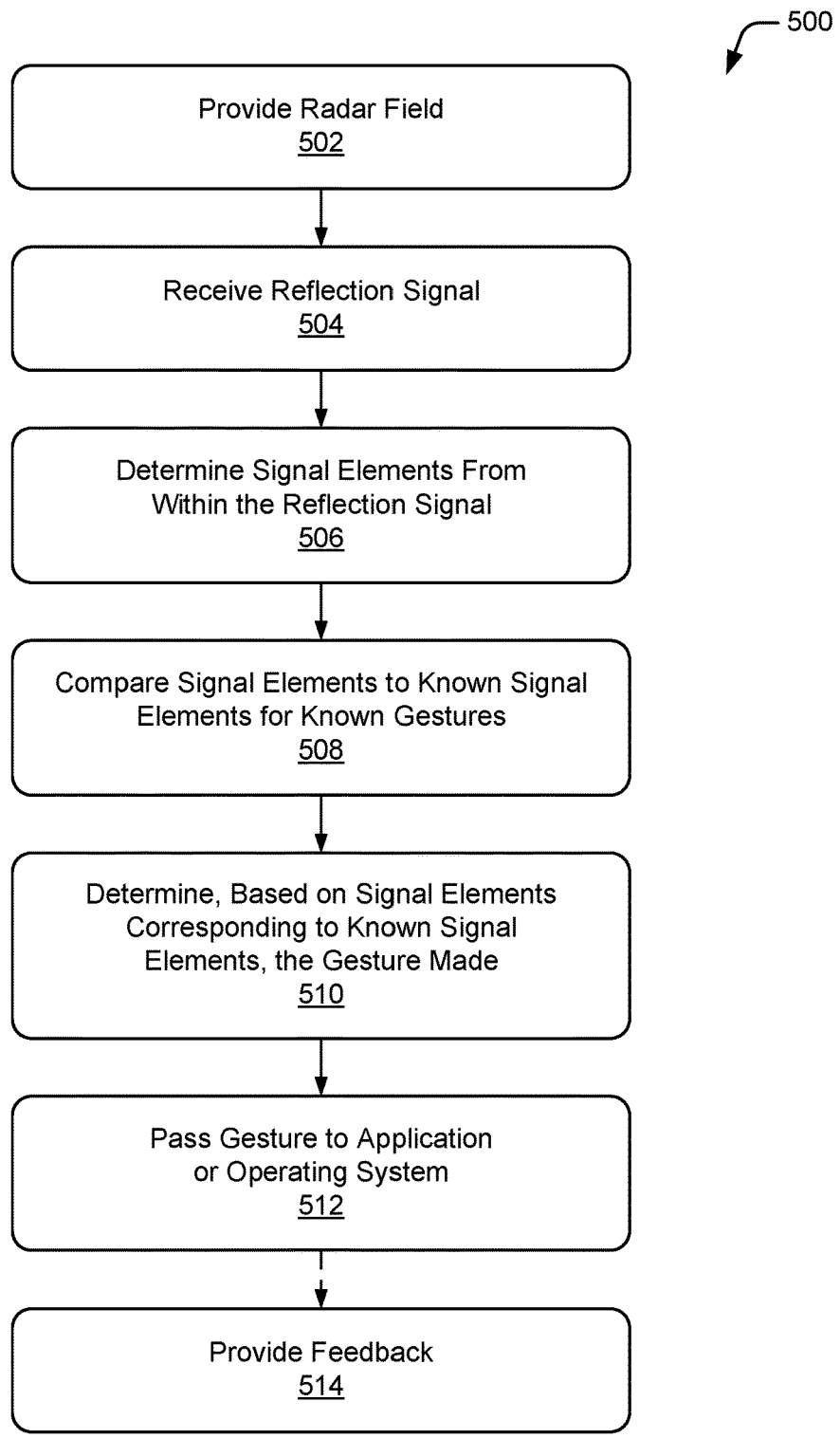
FIG. 5 illustrates an example method enabling wide-field radar-based gesture recognition using the signal elements determined at FIG. 3.

FIGS. 3 and 5 depict methods enabling wide-field radar-based gesture recognition. Method 300 determines signal elements that can be used to enable determination of a gesture from a later-received reflection signal having the signal elements. Method 500 determines a gesture from reflection signals based on signal elements associated with the gesture. These methods are shown as sets of blocks that specify operations performed but are not necessarily limited to the order or combinations shown for performing the operations by the respective blocks. In portions of the following discussion reference may be made to environment 100 of FIG. 1 and as detailed in FIG. 2, reference to which is made for example only. The techniques are not limited to performance by one entity or multiple entities operating on one device.

In more detail, method 300 builds, through many iterations, a database of signal elements associated with particular gestures. In effect, method 300 learns from reflected signals that a particular gesture is being performed. Method 300 may do so for each of the various different types of radar systems, though in an alternative embodiment set forth following methods 300 and 500, hardware abstraction layers for each of those radar systems can be developed to permit a hardware-independent gesture manager.

At 302 a radar field is provided. As shown in FIG. 2, system manager 222 may cause radar-emitting element 212 of wide-field radar-based gesture-recognition system 102 to provide (e.g., project or emit) one of the described radar fields noted above.

At 304, a first set of reflection signals caused by a first interaction of a first human action performing a gesture within the radar field is received. This set of reflection signals represents a first time period during which the first human action interacts with the radar field. By way of a first example, assume that a test person performs a particular gesture in the radar field. This test person can continue to perform this particular gesture or another person can perform the particular gesture, e.g. at different angles, with different hand or finger sizes, in different positions, in different orientations, and with different clothes, background, and other aspects that may affect the reflected signal. Thus, the reflection signals include signal elements other than those caused by the gesture being performed. This can intentionally be part of the learning process by providing, in some cases, one object and motion that is relatively consistent, with other objects and motions that are inconsistent. This may aid in the learning process described below.

At 306, a second set of reflection signals caused by a second interaction of a second human action performing the gesture within the radar field is received. This second set of reflection signals represents a second time period during which the first or second human action interacts with a radar field. Continuing the ongoing example, method 300 receives a second set of reflection signals, though as shown in the dashed arrow in FIG. 3, the techniques may perform operations with many different persons, iterations of the same gesture, and so forth to better understand the signal elements associated with gestures being made.

At 308, the first and second sets of reflection signals are analyzed to determine a signal element common to both sets of the reflection signals. In more detail, analyzing the multiple reflection signals determines the signal element common to both of the reflection signals. This can be performed by breaking the reflection signals into many signal elements and determining which of the signal elements correspond to both the first interaction and the second interaction for the same gesture. This is somewhat simplified, as iterations of many gestures being performed may be needed to accurately determine the signal elements that correspond to the gesture, such as 50, 100, or even hundreds of iterations.

As part of this, numerous signal elements are likely to be associated with objects and movements, or even noise, having nothing to do with the gesture itself These numerous signal elements, to some extent, can be ignored if no correlation with the gesture is found.

In some cases, this analysis is not based on tracking points or elements of a human action, such as determining particular points and orientation of those points, reconstructing the action, then determining how the body part moves or changes in order to determine the gesture being performed.

At 310, the signal element is associated with the gesture effective to enable a later received reflection signal caused by another interaction by a different (or same) human action to be associated with the gesture. At 312, these determined signal elements are stored in association with the gesture performed.

Figure 4:
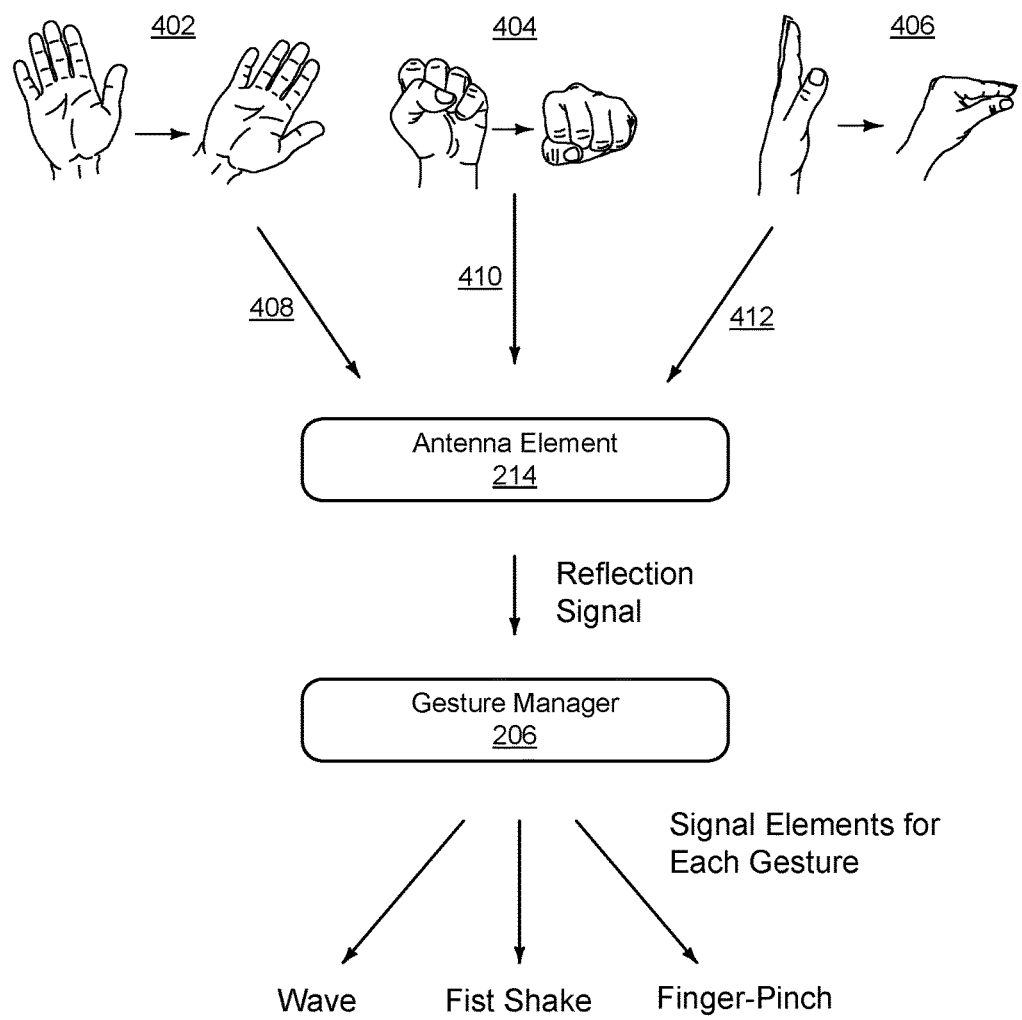
FIG. 4 illustrates gestures made and signal elements determined based on those gestures.

By way of one illustration, consider FIG. 4, which shows three different gestures being performed, one at a time with multiple iterations, to determine the signal elements associated with the gesture. The gestures illustrated include a hand wave gesture 402, a first shake gesture 404 (an American Sign Language (ASL) gesture for "Yes"), and a pinch finger gesture 406.

In this first case, hand wave gesture 402 is performed multiple times, with multiple reflection signals 408 being received by antenna element 214. Antenna element 214 passes the reflection signals to gesture manager 206, which performs the analysis described for operation 308. In the second case, first shake gesture 404 is performed multiple times, with multiple reflection signals 410 being received by antenna element 214. Antenna element 214 then passes the reflection signals to gesture manager 206, which determines signal elements for first shake gesture 404. Likewise, in the third case, pinch finger gesture 406 is performed multiple times within the radar field, at which point reflection signals are received by antenna element 214, which passes these to gesture manager 206. Gesture manager 206 then determines signal elements for the pinch finger gesture 406. Each of these recorded signal elements can later be used to determine gestures performed in real-life rather than as part of determining gestures themselves, though a feedback loop enabling continued improvement of the signal elements is also contemplated based on accuracies or inaccuracies of gesture recognition performed by users in their normal course of life.

Optionally, at 314, signal elements determined for the gesture can be refined based on other signal elements associated with other gestures. Consider, for example, a case where method 300 is performed for each of the three gestures shown in FIG. 4, resulting in three different determined signal elements. These different signal elements can be used to refine each other. Assume that one set of signal elements are determined for first shake gesture 404 and a second set of signal elements are determined for pinch finger gesture 406. At 314, the first set and the second set can be analyzed and compared, and, based on this, the weight of various signal elements can be decreased or increased. Thus, if similar, the signal elements may be reduced in weight or removed. If dissimilar, increased. If unique, also increased. Further, the signal elements determined for the third gesture—hand wave gesture 402, can also be used to refine either or both the signal elements for the other gestures.

Method 500 determines a gesture from reflection signals based on signal elements associated with the gesture. Thus, the single elements determined at method 300 are used to determine gestures at method 500.

At 502, a radar field is provided, such as the wide radar fields noted above. By way of example, consider FIG. 2 in which wide-field radar-based gesture recognition system 102 includes radar emitting element 212, antenna elements 214, and system manager 222. Radar emitting element 212 provides a wide radar field.

At 504, a reflection signal is received. As shown in FIG. 2, antenna element 214 receives a reflection signal based on some interaction with the provided radar field. This reflection signal is passed to system manager 222 for analysis.

At 506, signal elements from within the reflection signal are determined. This can be performed in the numerous different manners described above and below. Both type-independent and type-specific gesture managers can be used.

At 508, signal elements of the received reflection signal are compared with known signal elements for known gestures. These known signal elements are those provided by the process performed at method 300 noted above. Consider again, the examples shown in FIG. 4, in which a wave gesture 402 is illustrated. Assume, for this example, that a user is attempting to interact with a computing watch having a wide-field radar-based gesture recognition system through a wave gesture. The user performs the gesture within the radar field, which is within some number of centimeters or even a meter or two of the radar field provided by the radar system of the computing watch, and which causes a reflection signal to be received by the antenna element. This reflection signal is analyzed by system manager 222, which includes access to the signal elements known to be associated with various gestures. System manager 222 compares these and determines that the signal elements of the reflected signal and known signal elements correspond.

At 510, the gesture made is determined based on the correspondence between the signal elements and the known signal elements for the corresponding gesture. Continuing the ongoing example, system manager 222 determines that the user has performed a wave gesture.

At 512, the gesture is passed to an application or operating system. This application or operating system can be the active operating system for the entity to which it is passed, can be based on manners known in the art for passive gestures. Concluding the ongoing example, the application or operating system receives the wave gesture and responds accordingly. As part of, or prior to passing the gesture, gesture manager 206 may determine for which application or device the gesture is intended. Doing so may be based on identity-specific gestures, a current device to which the user is currently interacting, and/or based on controls through which a user may interaction with an application. Controls can be determined through inspection of the interface (e.g., visual controls), published APIs, and the like.

Optionally, at 514, feedback is provided. This feedback can be responsive to the gesture recognition failing or succeeding. Assume that the user performs the wave gesture in this example and that it was not recognized as a wave gesture. Assume also that the user indicates this or otherwise it is determined that the gesture was not properly recognize, such as the user continuing to perform the gesture until a wave gesture is recognized. System manager 222 passes this failure to gesture manager 206 or an entity associated therewith, so that set of known signal elements can be altered or improved for recognizing wave gestures. Likewise, successful gesture recognition can be provided to improve recognition by gesture manager 206.

In some cases method 300 or 500 operates on a device remote from the device being controlled. In this case the remote device includes entities of computing device 104 of FIGS. 1 and 2, and passes the gesture through one or more communication manners, such as wirelessly through transceivers and/or network interfaces (e.g., network interface 208 and transceiver 216). This remote device does not require all the elements of computing device 104—wide-field radar-based gesture-recognition system 102 may pass reflection signals sufficient for another device having gesture manager 206 to determine and use the gesture.

Operations of methods 300 and 500 can be repeated, such as by determining for multiple other applications and other controls through which the multiple other applications can be controlled. Methods 500 may then indicate various different controls to control various applications associated with either the application or the actor. In some cases, the techniques determine or assign unique and/or complex and three-dimensional controls to the different applications, thereby allowing a user to control numerous applications without having to select to switch control between them. Thus, an actor may assign a particular gesture to control one software application on computing device 104, another particular gesture to control another software application, and still another for a thermostat or stereo. This gesture can be used by multiple different persons, or may be associated with that particular actor once the identity of the actor is determined.

The preceding discussion describes methods relating to wide-field radar-based gesture recognition. Aspects of these methods may be implemented in hardware (e.g., fixed logic circuitry), firmware, software, manual processing, or any combination thereof. These techniques may be embodied on one or more of the entities shown in FIGS. 1, 2, 4, 6, and 8 (computing system 800 is described in FIG. 8 below), which may be further divided, combined, and so on. Thus, these figures illustrate some of the many possible systems or apparatuses capable of employing the described techniques. The entities of these figures generally represent software, firmware, hardware, whole devices or networks, or a combination thereof.

Example Alternative Hardware Abstraction Modules

As noted in part above, gesture manager 206 can determine the signal elements for each gesture based on the radar system being used. Thus, if there are substantial differences between radar fields between those performed for method 300 and later radar fields provided by other radar systems or similar radar systems that have substantial differences in the reflected signals, the accuracy of a gesture recognition may suffer. This can be countered, however, by tailoring each set of signal elements for each gesture to the radar system being used. In an alternative embodiment, a hardware abstraction layer is built for each of the different radar systems obviating, to a large extent, the need to have different gesture managers or different signal elements for each gesture, though these hardware abstraction layers are each trained in a manner similar to methods 300.

Figure 6:
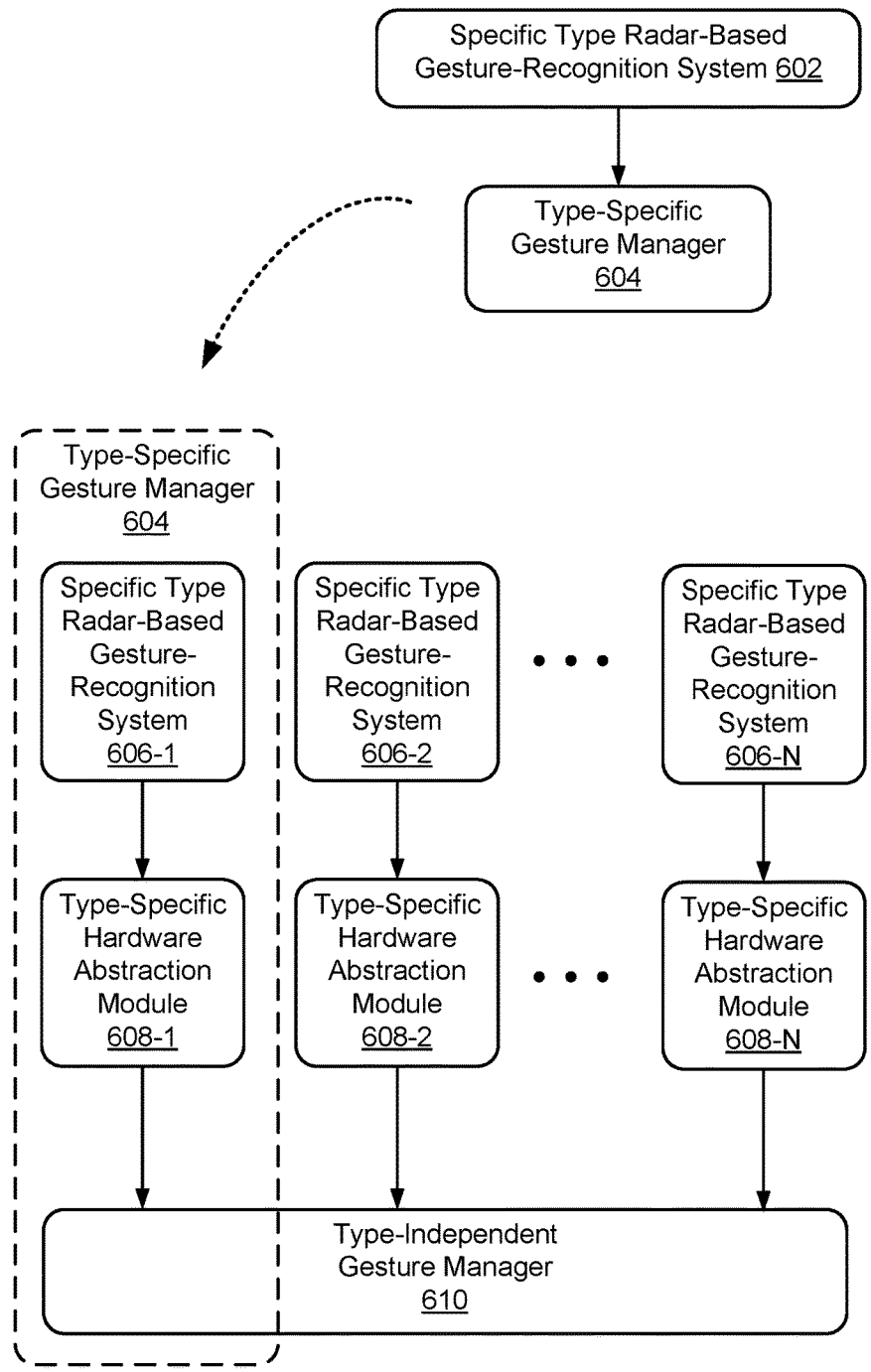
FIG. 6 illustrates example type-specific and type-independent gesture managers, including example type-specific hardware abstraction modules.

By way of illustration, consider FIG. 6, which shows a specific type of radar-based gesture recognition system 602 and a type-specific gesture manager 604. These are illustrations of the gesture manager and various types of radar systems noted above, where the radar system is used as part of the learning process to determine the signal elements specific to that radar type. Alternatively, consider various specific types of radar-based gesture recognition systems 606-1 and 606-2, through some arbitrary number "N" of these radar systems, shown at 606-N. See also specific types of hardware abstraction modules 224 matched to the respective type of radar system, these abstraction modules shown at 608-1, 608-2, and 608-N. Type-specific gesture manager 604, as shown in the dashed-line box, is an illustration of its dependence on the type of radar system and showing the corresponding components 606-1, 608-1, and a portion of type-independent gesture manager 610. Note however, that type-independent gesture manager 610 is independent, to a large extent, of the type of radar system as will be described in FIG. 7.

Figure 7:
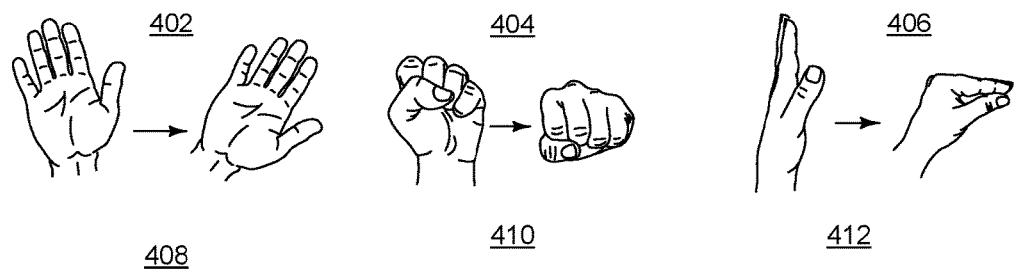
FIG. 7 illustrates an example of gestures made and signal elements determined using type-specific hardware abstraction modules.
Figure 7:
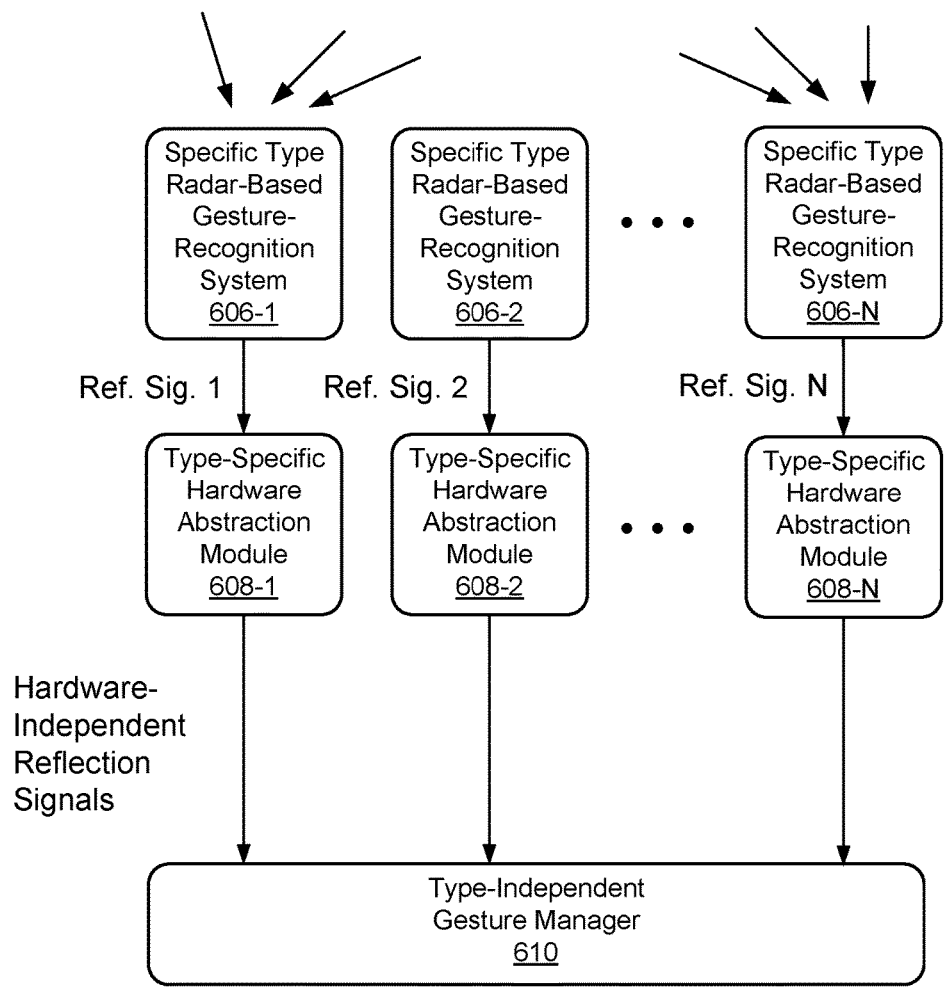

Consider also FIG. 7, in which case the various gestures 402, 404, and 406, are performed multiple times and reflection signals are received, 408, 410, and 412, respectively by the specific type radar-based gesture recognition system 606-1 (and each system through system "N"). Note that, for each of these specific types of systems, the reflection signal is shown differently at Ref. Sig. 1, Ref. Sig. 2, and Ref. Sig. N. Similarly to methods 300, signal elements are determined for the particular gestures, though in this case the abstraction modules make this determination and then provide hardware-independent reflection signals, as shown in FIG. 7. These hardware-independent reflection signals are then received by type-independent gesture manager 610, which then determines the gesture performed at methods 500.

In more detail, techniques in which type-specific hardware abstraction modules 608 can be developed are shown below. These techniques may also be used to aid in developing signal elements for type-specific gesture manager 604 as well. These techniques may therefore be used as embodiments of method 300. In some cases, hardware abstraction modules 608 can operate in single tone, stepped FM, linear FM, impulse, and chirped radar systems. As noted in part above, single tone radar architectures can be of a 60 GHz continuous wave with a single tone or stepped frequency. Stepped FM radar architectures can be of a 96 GHz continuous wave stepped frequency. Linear FM can be a 60 GHz frequency modulated continuous wave. Impulse radar architectures can be of a 60 GHz impulse. And chirped radar architectures have a chirped radar field. Note that radar architectures produce equivalent data products, with time and frequency domains being interchangeable.

Example Computing System

Figure 8:
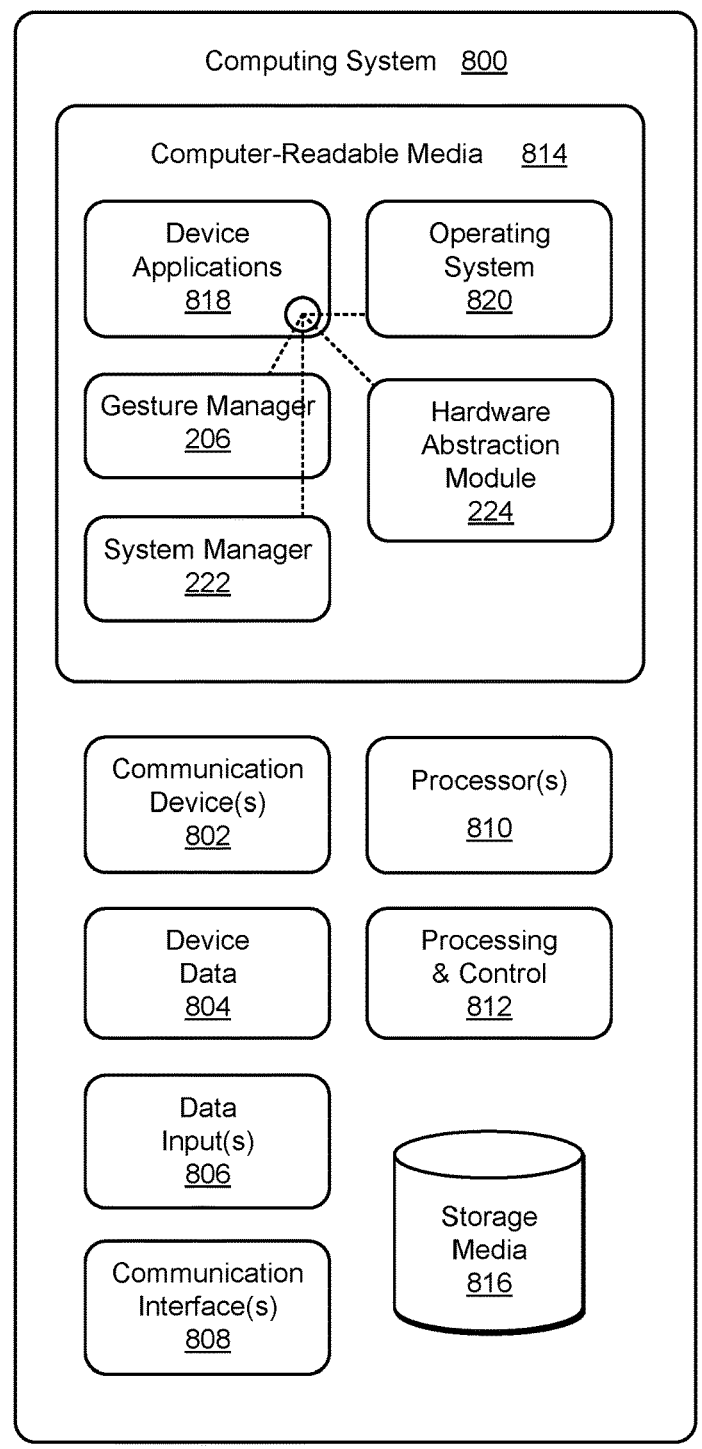
FIG. 8 illustrates an example computing system embodying, or in which techniques may be implemented that enable use of, wide-field radar-based gesture recognition.

FIG. 8 illustrates various components of example computing system 800 that can be implemented as any type of client, server, and/or computing device as described with reference to the previous FIGS. 1-7 to implement wide-field radar-based gesture recognition.

Computing system 800 includes communication devices 802 that enable wired and/or wireless communication of device data 804 (e.g., received data, data that is being received, data scheduled for broadcast, data packets of the data, etc.). Device data 804 or other device content can include configuration settings of the device, media content stored on the device, and/or information associated with a user of the device (e.g., an identity of an actor performing a gesture). Media content stored on computing system 800 can include any type of audio, video, and/or image data. Computing system 800 includes one or more data inputs 806 via which any type of data, media content, and/or inputs can be received, such as human utterances, interactions with a radar field, user-selectable inputs (explicit or implicit), messages, music, television media content, recorded video content, and any other type of audio, video, and/or image data received from any content and/or data source.

Computing system 800 also includes communication interfaces 808, which can be implemented as any one or more of a serial and/or parallel interface, a wireless interface, any type of network interface, a modem, and as any other type of communication interface. Communication interfaces 808 provide a connection and/or communication links between computing system 800 and a communication network by which other electronic, computing, and communication devices communicate data with computing system 800.

Computing system 800 includes one or more processors 810 (e.g., any of microprocessors, controllers, and the like), which process various computer-executable instructions to control the operation of computing system 800 and to enable techniques for, or in which can be embodied, wide-field radar-based gesture recognition. Alternatively or in addition, computing system 800 can be implemented with any one or combination of hardware, firmware, or fixed logic circuitry that is implemented in connection with processing and control circuits which are generally identified at 812. Although not shown, computing system 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 800 also includes computer-readable media 814, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Computing system 800 can also include a mass storage media device (storage media) 816.

Computer-readable media 814 provides data storage mechanisms to store device data 804, as well as various device applications 818 and any other types of information and/or data related to operational aspects of computing system 800. For example, an operating system 820 can be maintained as a computer application with computer-readable media 814 and executed on processors 810. Device applications 818 may include a device manager, such as any form of a control application, software application, signal-processing and control module, code that is native to a particular device, a hardware abstraction layer for a particular device, and so on. Device applications 818 also include system components, engines, or managers to implement wide-field radar-based gesture recognition, such as gesture manager 206, system manager 222, and in cases where gesture manager 206 is type-independent, hardware abstraction module 224.

CONCLUSION

Although techniques using, and apparatuses including, wide-field radar-based gesture recognition have been described in language specific to features and/or methods, it is to be understood that the subject of the appended claims is not necessarily limited to the specific features or methods described. Rather, the specific features and methods are disclosed as example implementations of wide-field radar-based gesture recognition.

What is claimed is:

1. A computer-implemented method comprising:
providing, by an emitter of a radar system, a radar field, the radar field comprising a contiguous radar field;
receiving, at a receiver of the radar system, a first set of reflection signals caused by a first interaction of a first human action performing a gesture within the contiguous radar field, the first set of reflection signals representing a first time period during which the first human action interacts with the contiguous radar field;
receiving, at the receiver of the radar system, a second set of reflection signals caused by a second interaction of a second human action performing the gesture within the contiguous radar field, the second set of reflection signals representing a second time period during which the second human action interacts with the contiguous radar field;
analyzing the first and second sets of reflection signals to determine a signal element common to the first and second sets of reflection signals, the analyzing comprising breaking the first and second sets of reflection signals into many signal elements and determining which of the many signal elements corresponds to both the first interaction of the first human action performing the gesture and the second interaction of the second human action performing the gesture, the determined signal element corresponding to the gesture; and associating the determined signal element with the gesture effective to enable a later received reflection signal including the determined signal element caused by an interaction by a different human action to be associated with the gesture.

2. The computer-implemented method as described in claim 1, wherein analyzing the first and second sets of reflection signals is not based on tracking points or elements of the first or second human action.

3. The computer-implemented method as described in claim 1, wherein the radar system is not a phased antenna array.

4. The computer-implemented method as described in claim 1, further comprising receiving multiple other sets of reflection signals caused by multiple other interactions of the first, second, or other human actions performing the gesture within the contiguous radar field and wherein analyzing the first and second sets of reflection signals analyzes the first set of reflection signals, the second set of reflection signals, and the multiple other sets of reflection signals.

5. The computer-implemented method as described in claim 4, wherein the contiguous radar field in which the first, second, and other sets of reflection signals is received is a same contiguous radar field provided by a same emitter of the same radar system.

6. The computer-implemented method as described in claim 1, further comprising refining the signal element associated with the gesture based on other signal elements associated with other gestures.

7. The computer-implemented method as described in claim 1, wherein the contiguous radar field comprises continuous wave radar or pulsed radar.

8. The computer-implemented method as described in claim 1 wherein breaking the first and second sets of reflection signals into many signal elements comprises digitally breaking up the reflection signal and analyzing, one at a time, each of the broken-up signals.

9. The computer-implemented method as described in claim 1 wherein the first time period occurs non-simultaneously with or prior to the second time period.

10. A computer-implemented method comprising:
providing a wide contiguous radar field;
receiving a reflection signal for a gesture made within the wide contiguous radar field;
determining signal elements of the reflection signal, the determining comprising breaking the reflection signal into the signal elements, the determined signal elements corresponding to the gesture;
comparing the determined signal elements of the reflection signal to known signal elements associated with known gestures;
determining, based on the determined signal elements of the reflection signal corresponding to the known signal elements, that the gesture made in the wide contiguous radar field is one of the known gestures; and
passing the one of the known gestures to an application or operating system.

11. The method of claim 10, further comprising:
receiving a second reflection signal for a second gesture;
determining second signal elements of the second reflection signal;
comparing the second signal elements of the second reflection signal to the known signal elements associated with the known gestures;
determining, based on the second signal elements not corresponding to the known signal elements, that the second gesture was not properly recognized; and
altering the known signal elements for the gesture based on the determined second signal elements.

12. The method of claim 10, further comprising:
receiving, from a user, multiple reflection signals from multiple iterations of a unique gesture made within the wide contiguous radar field, the unique gesture not being one of the known gestures;
determining signal elements of the multiple reflection signals, the signal elements sufficient to determine that a later-received reflection signal for a later-received gesture of the user matches the unique gesture; and
associating the determined signal elements to the unique gesture.

13. The method of claim 12, further comprising associating the unique gesture to a control of an application, the associating responsive to an assignment of the control and the application selected by the user.

14. The method of claim 10, wherein breaking the reflection signal into the signal elements comprises digitally breaking up the reflection signal and analyzing, one at a time, each of the broken-up signals.

15. The method of claim 10, wherein the wide contiguous radar field includes multiple contiguous radar fields from different directions or multiple contiguous radar fields having different frequencies or phases.

16. The method of claim 10, wherein the wide contiguous radar field is a continuous-wave radar field.

17. The method of claim 16, wherein the continuous-wave radar field is a single tone, linear frequency modulated (FM), or stepped FM field.

18. The method of claim 10, wherein the wide contiguous radar field is a pulsed-wave radar field, an impulse radar field, or a chirped radar field.

19. An apparatus comprising:
a wide-field radar-based gesture-recognition system comprising:
a radar-emitting element configured to provide a wide contiguous radar field; and
an antenna element configured to:
receive reflection signals from human tissue that is within the wide contiguous radar field; and
pass the received reflection signals; and
one or more computer-readable storage media having instructions stored thereon that, responsive to execution by the one or more computer processors, perform operations comprising:
causing the wide-field radar-based gesture-recognition system to provide the wide contiguous radar field with the radar-emitting element;
causing the wide-field radar-based gesture-recognition system to receive reflection signals for an interaction in the wide contiguous radar field with the antenna element;
breaking the received reflection signals into signal elements;
determining the signal elements corresponding to the interaction;
comparing the determined signal elements of the received reflection signals to known signal elements associated with known gestures;

determining, based on the determined signal elements corresponding to the known signal elements, that the interaction made in the wide contiguous radar field corresponds to one of the known gestures; and passing the one of the known gestures to an application or operating system.

20. The apparatus of claim 19, wherein the one or more computer-readable storage media is further configured to perform operations comprising:

receiving multiple reflection signals from multiple iterations of a complex gesture made within the wide contiguous radar field, the complex gesture not being one of the known gestures;

determining signal elements of the multiple reflection signals, the signal elements sufficient to determine that a later-received reflection signal for a later-received gesture matches the complex gesture; and associating the determined signal elements to the complex gesture.

* * * * *